US012219239B2

(12) United States Patent
Yakishyn et al.

(10) Patent No.: US 12,219,239 B2
(45) Date of Patent: Feb. 4, 2025

(54) METHOD OF CONTROLLING ELECTRONIC DEVICE BY RECOGNIZING MOVEMENT IN PERIPHERAL ZONE OF FIELD OF VIEW OF CAMERA, AND ELECTRONIC DEVICE THEREFOR

(71) Applicant: SAMSUNG ELECTRONICS CO., LTD., Suwon-si (KR)

(72) Inventors: Yevhenii Yakishyn, Kyiv (UA); Svitlana Alkhimova, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 17/494,440

(22) Filed: Oct. 5, 2021

(65) Prior Publication Data
US 2022/0159174 A1 May 19, 2022

Related U.S. Application Data

(63) Continuation of application No. PCT/KR2021/001359, filed on Feb. 2, 2021.

(30) Foreign Application Priority Data

Nov. 18, 2020 (KR) .................. 10-2020-0154796

(51) Int. Cl.
H04N 23/611 (2023.01)
G06F 3/01 (2006.01)

(52) U.S. Cl.
CPC ........... H04N 23/611 (2023.01); G06F 3/017 (2013.01)

(58) Field of Classification Search
CPC .... H04N 23/611; H04N 25/60; H04N 25/618; G06F 3/017
See application file for complete search history.

(56) References Cited

U.S. PATENT DOCUMENTS 10,636,156 B2  4/2020  Lee
11,163,373 B2  11/2021  Liu et al.
(Continued)

FOREIGN PATENT DOCUMENTS

KR  1020060070280 A  6/2006
KR  1020080029730 A  4/2008
(Continued)

OTHER PUBLICATIONS

International Search Report (PCT/ISA/210) and Written Opinion (PCT/ISA/237) dated Aug. 17, 2021 issued by the International Searching Authority in International Application No. PCT/KR2021/001359.
(Continued)

Primary Examiner — Nicholas G Giles
(74) Attorney, Agent, or Firm — Sughrue Mion, PLLC

(57) ABSTRACT

A method of controlling an electronic device by recognizing movement of an object includes obtaining at least one image including an image of the object; dividing the obtained at least one image into a middle zone and a peripheral zone; extracting one or more feature points of the object that are within the peripheral zone; recognizing movement of the object based on the extracted one or more feature points; and controlling the electronic device based on the recognized movement.

11 Claims, 24 Drawing Sheets

(56) References Cited

U.S. PATENT DOCUMENTS

| | | | |
|---|---|---|---|
| 2006/0136846 A1* | 6/2006 | Im | G06F 3/017 715/863 |
| 2013/0050076 A1 | 2/2013 | Hong et al. | |
| 2013/0070109 A1* | 3/2013 | Gove | H04N 25/702 348/207.1 |
| 2018/0088677 A1 | 3/2018 | Zhang et al. | |
| 2019/0072579 A1 | 3/2019 | Lee | |
| 2019/0294870 A1 | 9/2019 | Xie | |
| 2019/0356849 A1* | 11/2019 | Sapienza | G06V 20/10 |
| 2021/0191526 A1 | 6/2021 | Heo et al. | |

FOREIGN PATENT DOCUMENTS

| | | |
|---|---|---|
| KR | 101189633 B1 | 10/2012 |
| KR | 10-1761234 B1 | 7/2017 |
| KR | 1020200028771 A | 3/2020 |
| WO | 2016095057 A1 | 6/2016 |
| WO | 2020/140798 A1 | 7/2020 |

OTHER PUBLICATIONS

Wendorf, M., "How Gesture Recognition Will Change Our Relationship With Tech Devices?", Innovation, pp. 1-15, 2021, https://interestingengineering.com/how-gesture-recognition-will-change-our-relationship-with-tech-devices.

"Study researches 'gorilla arm' fatigue in mid-air computer usage", Phys Org, Purdue University, pp. 1-4, May 2017, https://phys.org/news/2017-05-gorilla-arm-fatigue-mid-air-usage.html.

"On-Device, Real-Time Hand Tracking with MediaPipe", Google AIBlog, pp. 1-7, Aug. 19, 2019, https://ai.googleblog.com/2019/08/on-device-real-time-hand-tracking-with.html.

* cited by examiner

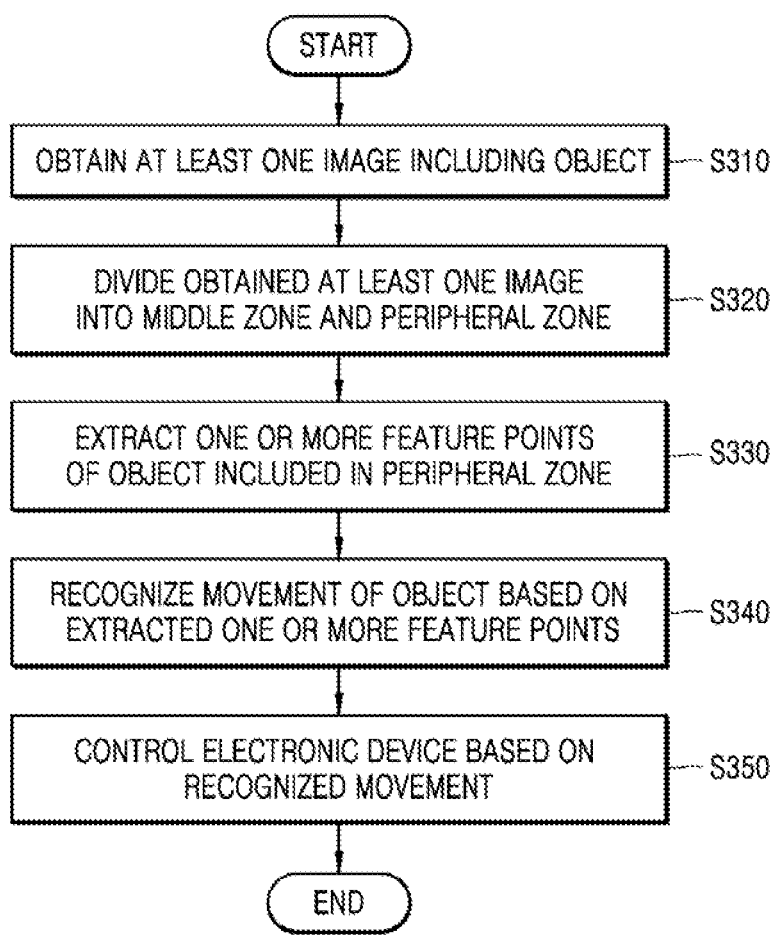

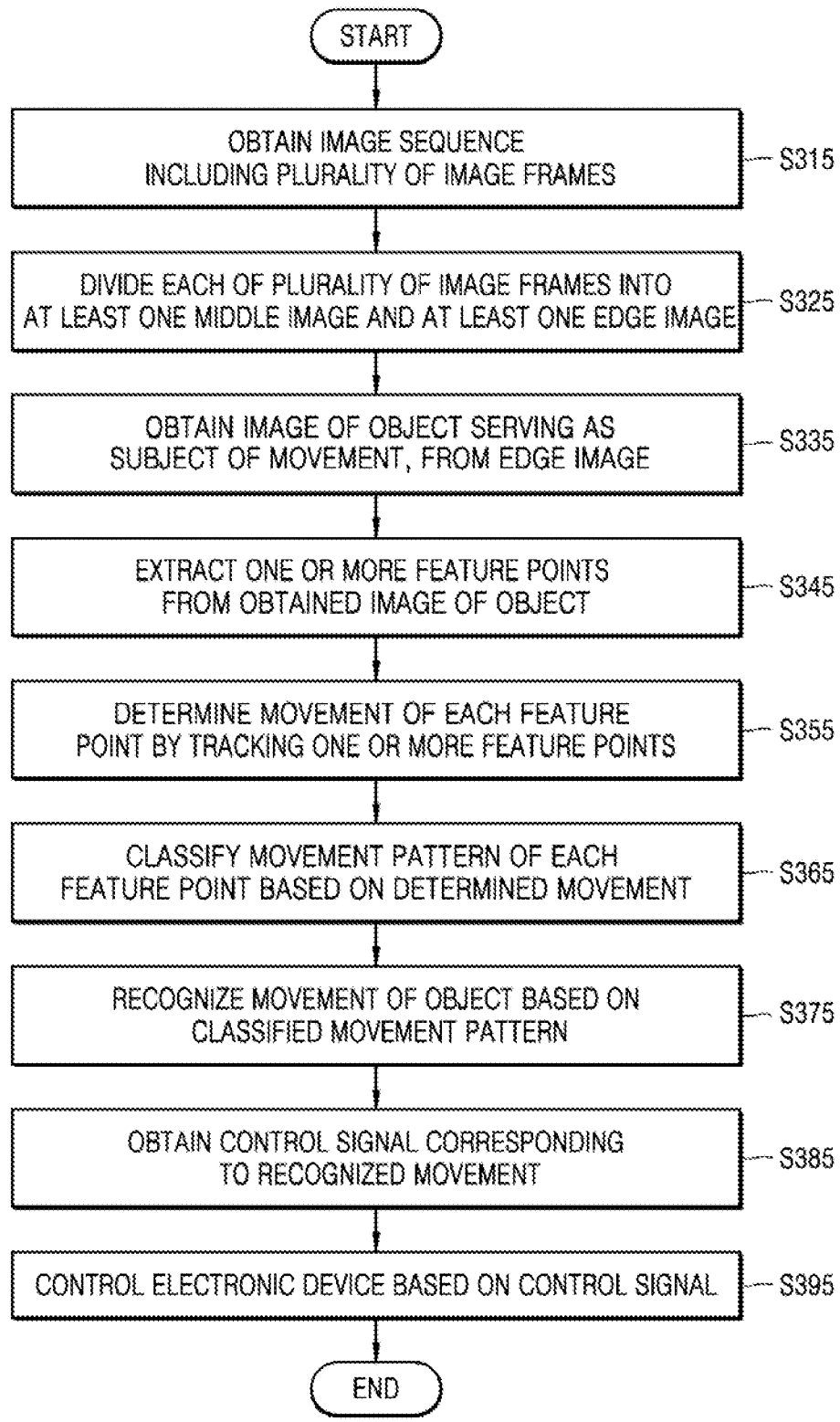

METHOD OF CONTROLLING ELECTRONIC DEVICE BY RECOGNIZING MOVEMENT IN PERIPHERAL ZONE OF FIELD OF VIEW OF CAMERA, AND ELECTRONIC DEVICE THEREFOR

CROSS-REFERENCE TO RELATED APPLICATION(S)

This application is a bypass continuation application of International Application PCT/KR2021/001359 filed on Feb. 2, 2021, which claims priority to Korean Patent Application No. 10-2020-0154796, filed on Nov. 18, 2020, in the Korean Intellectual Property Office, the disclosures of which are incorporated herein in their entireties by reference.

BACKGROUND

1. Field

The disclosure relates to a method of controlling an electronic device, and in particular to a method of controlling an electronic device by recognizing movement in a peripheral zone of a field of view (FOV) of a camera, and an electronic device therefor.

2. Description of Related Art

Due to the development of video processing technology and image recognition technology using a computer, various application fields thereof are being developed. Among the various application fields, gesture recognition technology is being continuously developed as a means for transferring data. Gesture recognition technology is technology by which a computer or a robot autonomously analyzes and recognizes human behavior, and may include touch gesture technology and space gesture technology. Specifically, touch gesture technology is technology for selecting an item by using an input device such as a touchscreen, and the use thereof is increasing due to the spread of smartphones. Space gesture technology is technology for analyzing how motion of a target to be tracked changes over time, by using an input device such as a camera, and interpreting the change in an abstract sense. A key element of gesture recognition technology may be to recognize the intention of a user more rapidly and accurately.

SUMMARY

Provided are an electronic device and a method capable of accurately recognizing movement of an object in a peripheral zone of a field of view (FOV) of a camera, where an image of at least a part of the object is not obtained, by using 'feature point extraction and tracking'.

Provided are an electronic device and a method capable of controlling the electronic device based on a different control signal depending on a location of an object in a FOV of a camera, and of efficiently using the FOV of the camera, by assigning a different control signal to each movement based on a type of the movement and the location of the object serving as a subject of the movement in the FOV of the camera.

According to an aspect of the disclosure, a method of controlling an electronic device by recognizing movement of an object may include obtaining at least one image including an image of the object; dividing the obtained at least one image into a middle zone and a peripheral zone; extracting, based on the object being within the peripheral zone, one or more feature points of the object that are within the peripheral zone; recognizing movement of the object based on the extracted one or more feature points; and controlling the electronic device based on the recognized movement.

The middle zone may include at least one middle image, and the peripheral zone comprises at least one edge image.

The extracting of the one or more feature points of the object may include obtaining, based on the object serving as a subject of movement, the image of the object, from the at least one edge image comprised in the peripheral zone; and extracting the one or more feature points from the obtained image of the object.

The obtaining of the image of the object from the at least one edge image may include obtaining a first object image from the at least one edge image; obtaining a second object image from the at least one middle image; verifying the first object image by using the second object image; and determining the verified first object image as the image of the object serving as the subject of the movement.

The extracting of the one or more feature points from the obtained image of the object may include removing noise unrelated to the movement of the object from the at least one edge image; and extracting the one or more feature points from the at least one edge image from which the noise has been removed.

The noise may be removed using a binarization mask.

The recognizing of the movement of the object based on the extracted one or more feature points may include determining a movement of each of the extracted one or more feature points by tracking the extracted one or more feature points; classifying a movement pattern of the extracted one or more feature points based on the determined movement; and recognizing the movement of the object based on the classified movement pattern.

The controlling of the electronic device based on the recognized movement may include obtaining a control signal corresponding to the recognized movement; and controlling the electronic device based on the obtained control signal.

According to another aspect of the disclosure, a method of controlling an electronic device by recognizing multiple movements may include obtaining at least one image; dividing the obtained at least one image into a middle zone and a peripheral zone; recognizing movement of a first object located in the middle zone; recognizing movement of a second object located in the peripheral zone; and controlling the electronic device based on the movement of the first object and the movement of the second object. The recognizing of the movement of the second object may include extracting one or more feature points of the second object; and recognizing the movement of the second object based on the extracted one or more feature points.

The controlling of the electronic device based on the movement of the first object and the movement of the second object may include combining the movement of the first object and the movement of the second object; and controlling the electronic device based on the combined movement.

According to another aspect of the disclosure, an electronic device for obtaining a control signal by recognizing movement of an object, the electronic device may include a camera for obtaining an image; a storage for storing a program comprising one or more instructions; and at least one processor configured to execute the one or more instructions stored in the storage to: obtain at least one image including an image of the object by controlling the camera;

divide the obtained at least one image into a middle zone and a peripheral zone; extract one or more feature points of the object that are within the peripheral zone; recognize movement of the object based on the extracted one or more feature points; and obtain the control signal based on the recognized movement.

The middle zone may include at least one middle image, and the peripheral zone comprises at least one edge image.

The at least one processor may be further configured to execute the one or more instructions to: remove noise unrelated to the movement of the object from the at least one edge image; and extract the one or more feature points from the at least one edge image from which the noise has been removed.

The at least one processor may be further configured to execute the one or more instructions to remove the noise unrelated to the movement from the at least one edge image by using a binarization mask.

The at least one processor may be further configured to execute the one or more instructions to: determine a movement of each of the extracted one or more feature points by tracking the extracted one or more feature points; classify a movement pattern of the extracted one or more feature points based on the determined movement; and recognize the movement of the object based on the classified movement pattern.

According to another aspect of the disclosure, a method of controlling an electronic device by recognizing movement of an object, the method may include obtaining at least one image including an image of the object; dividing the obtained at least one image into a middle zone and a peripheral zone; extracting, based on a portion of the object within the middle zone being below a threshold, one or more feature points of the object that are within the peripheral zone; extracting, based on a portion of the object within the middle zone being above the threshold, joint information of the object; recognizing movement of the object based on one of the extracted one or more feature points or the joint information; and controlling the electronic device based on the recognized movement.

The middle zone may include at least one middle image, and the peripheral zone comprises at least one edge image.

Based on the object being within the middle zone, the at least one middle image may include segments of the peripheral zone that include the object.

BRIEF DESCRIPTION OF DRAWINGS

FIG. 3A is a flowchart of a method of controlling an electronic device by recognizing movement of an object, according to an embodiment.

FIG. 3B is a flowchart of a method of controlling an electronic device by recognizing movement of an object, according to an embodiment.

DETAILED DESCRIPTION

Figure 1:
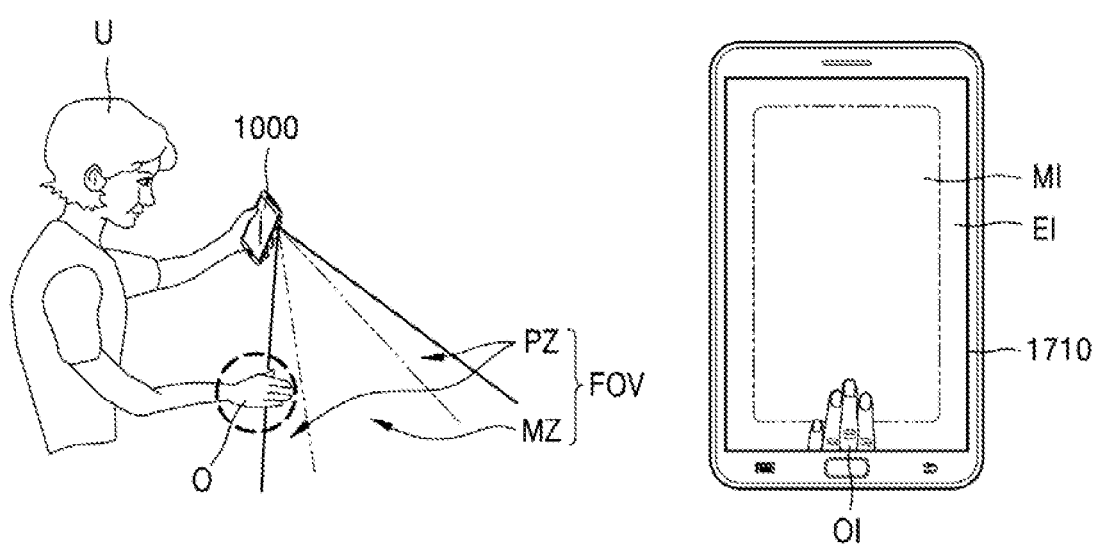
FIG. 1 is a schematic diagram for describing a method, performed by an electronic device, of recognizing movement in a peripheral zone of a field of view (FOV) of a camera, according to an embodiment.

Hereinafter, the disclosure will be described in detail by explaining embodiments of the disclosure with reference to the attached drawings. The disclosure may, however, be embodied in many different forms and should not be construed as being limited to the embodiments set forth herein. In the drawings, parts not related to the disclosure are not illustrated for clarity of explanation, and like reference numerals denote like elements throughout.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described in relevant parts of the disclosure. Therefore, it is noted that the terms used herein are construed based on practical meanings thereof and the whole content of this specification, rather than being simply construed based on names of the terms.

As used herein, the singular forms "a", "an", and "the" are intended to include the plural forms as well, unless the context clearly indicates otherwise. All terms (including technical and scientific terms) used herein have the same meaning as generally understood by one of ordinary skill in the art.

It will be understood that the terms "comprises", "comprising", "includes" and/or "including", when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

Throughout the specification, when an element is referred to as being "connected to" another element, the element can be "directly connected to" the other element or be "electrically connected to" the other element via an intervening element. The terms "comprises", "comprising", "includes" and/or "including", when used herein, specify the presence of stated elements, but do not preclude the presence or addition of one or more other elements, unless otherwise indicated herein.

The phrase "configured (or set) to" as used herein may be interchangeably used with, for example, "suitable for", "having the capacity to", "designed to", "adapted to", "made to", or "capable of" depending on the circumstances. The phrase "configured (or set) to" may not necessarily represent only "specifically designed to" in terms of hardware. Instead, in a certain circumstance, the phrase "a system configured to" may represent that the system is "capable of" something in conjunction with other devices or components. For example, the phrase "a processor configured (or set) to perform A, B, and C" may refer to a dedicated processor (e.g., an embedded processor) for performing those operations or a generic-purpose processor (e.g., a central processing unit (CPU) or an application processor (AP)) for performing those operations by executing one or more software programs stored in memory.

Artificial intelligence (AI)-related functions may be performed using a processor and a memory. The processor may include one or more processors. In this case, each of the one or more processors may be a general-purpose processor such as a CPU, an AP, or a digital signal processor (DSP), a dedicated graphics processor such as a graphics processing unit (GPUs) or a vision processing unit (VPU), or a dedicated AI processor such as a neural processing unit (NPU). The one or more processors may control input data to be processed according to a predefined operation rule or AI model stored in the memory. Alternatively, when the one or more processors are dedicated AI processors, the dedicated AI processors may be designed in a hardware structure specialized for processing of a specific AI model.

The predefined operation rule or AI model may be made through training. Herein, being made through training means that a basic AI model is trained based on a learning algorithm by using multiple pieces of training data and thus a predefined operation rule or AI model configured to achieve desired characteristics (or purposes) is made. The training may be performed directly by a machine having an AI function according to the disclosure, or via a separate server and/or system. Examples of the learning algorithm may include supervised learning, unsupervised learning, semi-supervised learning, and reinforcement learning, but are not limited thereto.

The AI model may include a plurality of neural network layers. Each of the plurality of neural network layers may have a plurality of weight values and performs neural network computation through computation between a computation result of a previous layer and the plurality of weight values. The plurality of weight values of the plurality of neural network layers may be optimized based on a result of training the AI model. For example, the plurality of weight values may be updated to reduce or minimize a loss value or a cost value obtained by the AI model during the training process. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

As used herein, a 'field of view (FOV)' of a camera may refer to an area of an image or a video captured using the camera. The FOV may also be called a degree of FOV (DFOV). The area of the image or the video captured using the camera may indicate an area of an image or a video displayed in a screen area of a display.

As used herein, a 'video' or an 'image sequence' may refer to a moving image. The video or the image sequence may include a series of temporally sequential still images.

As used herein, a 'video frame' or an 'image' may refer to a single still image output on a display. That is, in a video for making a moving image by displaying sequential frame images at a short time interval, the video frame or the image may refer to a single frame image.

As used herein, a 'monocular camera' may include a single light-receiving part to capture an image or a video, and may refer to a camera for obtaining a single image at a time. The image or the video captured using the monocular camera may be 2-dimensional.

As used herein, a 'binocular camera' may include two light-receiving parts to capture an image or a video, and refers to a camera for obtaining two images at a time. The image or the video captured using the binocular camera may be 2-dimensional or 3-dimensional. Using the binocular camera, a distance to an object may be calculated based on the two obtained images and thus a 3-dimensional video may be obtained.

As used herein, 'feature points (or key points)' refer to points which are distinguishable from a background and are easily identifiable within a video or an image. The feature points may be used to track or recognize an object in the video. For example, points which are easily identifiable when an object changes in shape, size, or location, or points which are easily identifiable when lighting or a point of view of a camera changes may be set as feature points. For example, corner points of an object image or points located on the edge of an object may serve as feature points.

As used herein, a 'gesture' refers to movement of an object, e.g., a specific thing or a body part such as a hand or a foot.

According to an embodiment, an electronic device may be controlled to recognize movement of an object. The method may include obtaining at least one image including the object, dividing the obtained at least one image into a middle zone and a peripheral zone, extracting one or more feature points of the object included in the peripheral zone, recognizing movement of the object based on the extracted one or more feature points, and controlling the electronic device based on the recognized movement.

The obtaining of the at least one image including the object may include obtaining an image sequence including a plurality of image frames, and the dividing of the obtained at least one image into the middle zone and the peripheral zone may include dividing each of the plurality of image frames included in the obtained image sequence, into the middle zone and the peripheral zone.

The dividing of the obtained at least one image into the middle zone and the peripheral zone may include dividing the at least one image in the form of a rectangular grid.

The middle zone may include at least one middle image, and the peripheral zone may include at least one edge image.

The extracting of the one or more feature points of the object included in the peripheral zone may include obtaining an image of the object serving as a subject of the movement, from the edge image included in the peripheral zone, and extracting the one or more feature points from the obtained image of the object.

The obtaining of the image of the object serving as the subject of the movement, from the edge image may include obtaining a first object image from the edge image, obtaining a second object image from the middle image, verifying the first object image by using the second object image, and determining the verified first object image as the image of the object serving as the subject of the movement.

The object serving as the subject of the movement may include a hand of a user of the electronic device, and the obtaining of the image of the object serving as the subject of the movement, from the edge image may include obtaining the image of the object from the edge image by using a skin color model-based algorithm.

The extracting of the one or more feature points from the obtained image of the object may include removing noise unrelated to the movement from the edge image, based on the image of the object, and extracting the one or more feature points from the edge image from which the noise has been removed.

The noise may be removed using a binarization mask.

The recognizing of the movement of the object based on the extracted one or more feature points may include determining movement of each feature point by tracking the extracted one or more feature points, classifying a movement pattern of each feature point based on the determined movement, and recognizing the movement of the object based on the classified movement pattern.

The movement pattern may be classified using a support vector machine (SVM) or a recurrent neural network (RNN).

The controlling of the electronic device based on the recognized movement may include obtaining a control signal corresponding to the recognized movement, and controlling the electronic device based on the obtained control signal.

According to an embodiment, a method of controlling an electronic device may control the electronic device to recognizing multi-movement. The method may include obtaining at least one image, dividing the obtained at least one image into a middle zone and a peripheral zone, recognizing movement of a first object included in the middle zone, recognizing movement of a second object included in the peripheral zone, and controlling the electronic device based on the movement of the first object and the movement of the second object. The recognizing of the movement of the second object may include extracting one or more feature points of the second object, and recognizing the movement of the second object based on the extracted one or more feature points.

The controlling of the electronic device based on the movement of the first object and the movement of the second object may include combining the movement of the first object and the movement of the second object, and controlling the electronic device based on the combined movement.

According to an embodiment, an electronic device may obtain a control signal by recognizing movement of an object. The electronic device may include a camera for obtaining an image, a storage for storing a program including one or more instructions, and at least one processor for executing the one or more instructions stored in the storage. The at least one processor may obtain at least one image by controlling the camera, divide the obtained at least one image into a middle zone and a peripheral zone, extract one or more feature points of an object included in the peripheral zone, recognize movement of the object based on the extracted one or more feature points, and obtain a control signal based on the recognized movement.

The middle zone may include at least one middle image, and the peripheral zone may include at least one edge image.

The processor may execute the one or more instructions to remove noise unrelated to the movement from the edge image, based on an image of the object, and extract the one or more feature points from the edge image from which the noise has been removed.

The processor may execute the one or more instructions to remove the noise unrelated to the movement from the edge image by using a binarization mask.

The processor may execute the one or more instructions to determine movement of each feature point by tracking the extracted one or more feature points, classify a movement pattern of each feature point based on the determined movement, and recognize the movement of the object based on the extracted one or more feature points, by recognizing the movement of the object based on the classified movement pattern.

According to an embodiment, an electronic device may obtain a control signal by recognizing multi-movement. The electronic device may include a camera for obtaining an image, a storage for storing a program including one or more instructions, and at least one processor for executing the one or more instructions stored in the storage. The at least one processor may obtain at least one image by controlling the camera, divide the obtained at least one image into a middle zone and a peripheral zone, recognize movement of a first object included in the middle zone, recognize movement of a second object included in the peripheral zone, and obtain a control signal corresponding to the movement of the first object and the movement of the second object. The processor may execute the one or more instructions to extract one or more feature points of the second object, and recognize of the movement of the second object based on the extracted one or more feature points.

Reference will now be made in detail to embodiments, examples of which are illustrated in the accompanying drawings.

FIG. 1 is a diagram for describing a method, performed by an electronic device 1000, of recognizing movement in a peripheral zone PZ of a field of view (FOV) of a camera, according to an embodiment.

The electronic device 1000 may be a device for obtaining or capturing a video or an image sequence and outputting an output video or an output image sequence. The electronic device 1000 may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, a wearable device, an augmented reality (AR) device, a home appliance, or another mobile or non-mobile computing device.

The AR device may be a device capable of implementing augmented reality (AR), and generally include AR glasses worn on the face of a user, and a head-mounted display (HMD), a virtual reality headset (VRH), or an AR helmet worn on the head of the user. The head-mounted device may provide a supersized screen to the user by locating a display in front of the eyes of the user, and provide a realistic virtual world because the screen moves according to movement of the user.

The electronic device 1000 is not limited to the above-mentioned examples, and may include all types of devices for obtaining a video or an image sequence, processing the video or the image sequence based on a control signal, and outputting the processed video or image sequence.

Referring to FIG. 1, the electronic device 1000 may obtain a video or an image sequence by using a camera 1100 (see FIG. 2) embedded therein, and obtain a control signal from the obtained video or image sequence. The electronic device 1000 according to an embodiment may analyze how motion of an object O to be tracked changes over time, by using an input device such as the camera, and obtain a control signal corresponding to the change. That is, space gesture technology or computer vision technology may be applied to the electronic device 1000 according to an embodiment.

The computer vision technology may refer to a technology for implementing human vision by using a computer. That is, computer vision may relate to an artificial intelligence (AI) system for extracting information from an image. To extract the information from the image, for example, a technology for detecting 3-dimensional (3D) spatial information, e.g., a type, a size, a direction, and a location, of an object in an image in real time, a technology for identifying objects and recognizing motion of each object like humans, or a technology by which a machine recognizes a location thereof may be used. In addition, computer vision combines a camera, edge-based or cloud-based computing, software, and AI to enable a system to detect and identify an object.

In the computer vision technology, for example, 'hand skeleton detection and tracking' may be used to recognize motion of a hand. In this case, a hand skeleton may be analyzed from a 'hand image OI' included in a video captured using the camera 1100, and movement, i.e., a gesture, of a hand may be recognized by comparing the hand skeleton with a database (DB).

Gesture (or movement) recognition using 'hand skeleton detection and tracking' may be easily used when an image of a whole hand is captured using the camera 1100. That is, when a hand O of a user U is located in the peripheral zone PZ of the FOV of the camera 1100 as illustrated in FIG. 1, only a part of the hand O may be photographed using the camera 1100 and, in this case, a hand skeleton is not represented on a captured object image OI in its entirety and thus accuracy of gesture (or movement) recognition using 'hand skeleton detection and tracking' is greatly reduced.

To increase the accuracy of gesture (or movement) recognition, initially, the hand O may be located in such a manner that the entirety of the hand O is in the FOV of the camera 1100. This may be achieved by locating the hand O, which serves as a subject of a gesture (or movement), away from the camera 1100. In a case where the hand O is stretched away from the camera 1100 for gesture (or movement) recognition, the user U uses energy and arm muscles may easily get tired.

For example, although consumption of energy to locate the hand O away from the camera 1100 for accurate recognition is acceptable when a delicate hand skeleton needs to be recognized, that is, when a gesture (or movement) corresponding to a complicated control signal needs to be recognized, it may be inefficient to always stretch the hand O away from the camera 1100 even in order to control the electronic device 1000 based on a simple control signal.

As such, the electronic device 1000 according to an embodiment may divide the FOV of the camera 1100 into a middle zone MZ and the peripheral zone PZ, and perform gesture (or movement) recognition by using hand skeleton detection and tracking in the middle zone MZ and using feature point extraction in the peripheral zone PZ. In an embodiment, a gesture (or movement) recognized in the peripheral zone PZ may be set to correspond to a simple control signal.

Referring back to FIG. 1, in an embodiment, the FOV of the camera 1100 may include the middle zone MZ, and the peripheral zone PZ located on the edge of the middle zone MZ. A video or an image obtained by the camera 1100 may be output on a display 1710 included in the electronic device 1000. For example, a video obtained in the peripheral zone PZ of the FOV of the camera 1100 may be displayed as an edge image EI located on the edge of a screen area of the display 1710, and a video obtained in the middle zone MZ of the FOV of the camera 1100 may be displayed as a middle image MI located in the middle of the screen area of the display 1710. Hereinafter, the edge image EI displayed on the screen area of the display 1710 may also be referred to as the peripheral zone PZ, and the middle image MI may also be referred to as the middle zone MZ.

In an embodiment, when the hand O of the user U located in the peripheral zone PZ of the FOV of the camera 1100 is photographed, a captured hand image (i.e., the object image OI) may be output as the edge image EI on the display 1710. The electronic device 1000 according to an embodiment may recognize a gesture (or movement) by using feature point extraction from the hand image OI captured in the peripheral zone PZ of the FOV of the camera 1100, and obtain a simple control signal corresponding to the recognized gesture (or movement).

Figure 2:
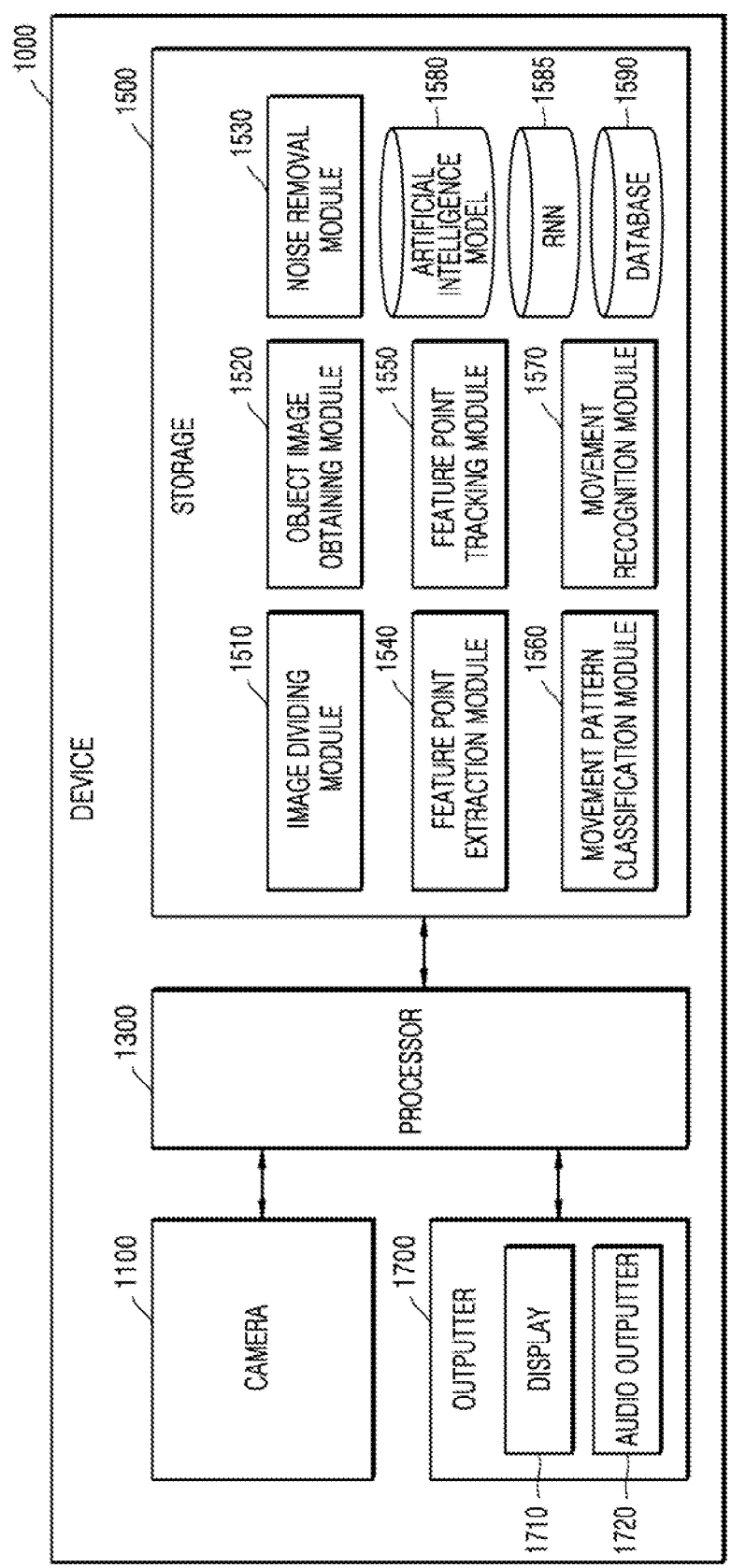
FIG. 2 is a block diagram of an electronic device according to an embodiment.

FIG. 2 is a block diagram of the electronic device 1000 according to an embodiment.

Referring to FIG. 2, the electronic device 1000 may include the camera 1100, a processor 1300, a storage 1500, and an outputter 1700. Not all elements shown in FIG. 2 are essential elements of the electronic device 1000. The electronic device 1000 may include a larger or smaller number of elements compared to those shown in FIG. 2.

The camera 1100 may obtain a video, an image, or an image sequence. In an embodiment, the camera 1100 may include a video recorder for obtaining visual images, and an audio recorder for obtaining auditory sound. In an embodiment, the camera 1100 may be a single element which is not physically divided into a video recorder and an audio recorder. The camera 1100 may include at least one of, for example, a monocular camera, a binocular camera, or an infrared camera.

The outputter 1700 may output an output video to an external environment. The outputter 1700 may include the display 1710 and an audio outputter 1720.

The display 1710 may display and output a visual image to an external environment. For example, the display 1710 may output an image sequence to an external environment. In an embodiment, the display 1710 may include a panel. The display 1710 may include at least one of, for example, a liquid crystal display (LCD), a digital mirror device, a liquid crystal on silicon (LCoS) display, a thin film transistor-liquid crystal display (TFT-LCD), an organic light-emitting diode (OLED), a micro light-emitting diode (micro LED), a flexible display, a 3D display, or an electrophoretic display.

In an embodiment, the electronic device 1000 may be an electronic device for providing virtual reality (VR). In this case, when the display 1710 is provided as an LCD, a digital mirror device, or an LCoS display, the electronic device 1000 may further include a light source for irradiating light to an output screen area of the display 1710. In an embodiment, when the display 1710 may autonomously generate light, for example, when an OLED or a micro LED is used, the electronic device 1000 may provide a good-quality virtual area to a user without including a separate light source. When the display 1710 does not include a separate light source, the electronic device 1000 may be light-weighted.

The audio outputter 1720 may reproduce and output auditory sound to an external environment. In an embodiment, the audio outputter 1720 may include a speaker. The audio outputter 1720 may include at least one of, for example, a single speaker, two or more speakers, a mono speaker, a stereo speaker, a surround speaker, a headset, or earphones.

In an embodiment, the display 1710 and the audio outputter 1720 of the outputter 1700 may be a single element which is not physically divided.

The storage 1500 may store programs to be executed by the processor 1300 described below to control operations of the electronic device 1000. The storage 1500 may store programs including one or more instructions for controlling operations of the electronic device 1000. The storage 1500 may store instructions and program codes readable by the processor 1300. In an embodiment, the processor 1300 may be implemented to execute the instructions or the codes of the programs stored in the storage 1500. The storage 1500 may store data input to or to be output from the electronic device 1000.

The storage 1500 may include at least one type of storage medium from among, for example, flash memory, a hard disk, a multimedia card micro, a memory card (e.g., a secure digital (SD) or extreme digital (XD) card), random access memory (RAM), static random access memory (SRAM), read-only memory (ROM), electrically erasable programmable read-only memory (EEPROM), programmable read-only memory (PROM), magnetic memory, a magnetic disc, and an optical disc.

The programs stored in the storage 1500 may be classified into a plurality of modules depending on functions thereof. For example, the storage 1500 may include an image dividing module 1510, an object image obtaining module 1520, a noise removal module 1530, a feature point extraction module 1540, a feature point tracking module 1550, a movement pattern classification module 1560, and a movement recognition module 1570. The storage 1500 may further include an AI model 1580, a recurrent neural network (RNN) 1585, and a database (DB) 1590.

The processor 1300 may control overall operations of the electronic device 1000. For example, the processor 1300 may execute the programs stored in the storage 1500 to control the camera 1100, the outputter 1700 including the display 1710 and the audio outputter 1720, and the storage 1500.

The processor 1300 may be configured as a hardware element for performing calculation, logic and input/output operation, and signal processing. The processor 1300 may include at least one of, for example, a central processing unit (CPU), a microprocessor, a graphics processing unit (GPU), application-specific integrated circuits (ASICs), digital signal processors (DSPs), digital signal processing devices (DSPDs), programmable logic devices (PLDs), or field-programmable gate arrays (FPGAs), but is not limited thereto.

The processor 1300 may execute one or more instructions stored in the storage 1500, to obtain at least one image including an object by using the camera 1100, or obtain a video or an image sequence including a plurality of image frames. The video may include images corresponding to visual data, and sound corresponding to auditory data.

The processor 1300 may execute one or more instructions configuring the image dividing module 1510 from among the programs stored in the storage 1500, to divide the obtained at least one image into a middle zone and a peripheral zone, or divide each of the plurality of image frames included in the obtained image sequence, into at least one middle image and at least one edge image. In an embodiment, the object included in the middle zone or the middle image may be located in a FOV of the camera 1100 in its entirety, and thus an image of the whole object may be displayed on the display 1710. In an embodiment, only a part of the object included in the peripheral zone or the edge image may be located in the FOV of the camera 1100, and thus an image of the whole object may not be displayed on the display 1710 (that is, only a part thereof may be displayed). In an embodiment, a criterion for dividing the image into the middle zone and the peripheral zone or into the middle image and the edge image may include whether the image of the object is regarded as being displayed on the display 1710 as a whole or in its entirety.

For example, although a specific object is physically located on the edge of the FOV of the camera 1100, when an image of the whole object is displayed on the display 1710, the image of the object may be regarded as being included in the middle zone and corresponding to the middle image. Alternatively, for example, although a specific object is physically located in the middle of the FOV of the camera 1100, when only a part of an image of the object is displayed on the display 1710, the image of the object may be regarded as being included in the peripheral zone and corresponding to the edge image. As described above, the edge image or the middle image may be determined not based on a physical location of a specific object image but based on how much of the object image is displayed on the display 1710.

The processor 1300 may execute one or more instructions configuring the object image obtaining module 1520 from among the programs stored in the storage 1500, to obtain an image of the object serving as a subject of movement, from the divided edge image. The image may include one non-divided continuous screen image. Objects, e.g., things and body parts such as a hand and a foot, may be divided from the continuous screen image. Each of the divided objects may serve as a subject of movement. In an embodiment, at least one object image may be obtained from an image by using the AI model 1580 or the DB 1590 where image files are accumulated.

In an embodiment, the object serving as the subject of the movement may include a hand of a user of the electronic device 1000. In this case, the processor 1300 may obtain an image of the user's hand serving as the subject of the movement, from the divided edge image by using a skin color model-based algorithm.

In an embodiment, the processor 1300 may execute one or more instructions configuring the object image obtaining module 1520 from among the programs stored in the storage 1500, to obtain a first object image from the edge image and obtain a second object image from the middle image. Furthermore, the processor 1300 may execute one or more instructions from among the programs stored in the storage 1500, to verify the first object image by using the second object image.

For example, an image of a specific object may be included in the edge image on one image from among a series of images included in the image sequence, and may be included in the middle image on another image. That is, the image of the specific object may serve as the second object image at a specific timing, and serve as the first object image at another timing. In this case, the processor 1300 may obtain the first and second object images at two timings, and verify the first object image by using the second object image including the image of the whole object.

For example, when a plurality of objects are present in one image, at least one object image may be included in the middle image, and at least one other object image may be included in the edge image. At this time, within one image, the object image included in the edge image may serve as the first object image, and the object image included in the middle image may serve as the second object image. For example, when both hands of the user serve as objects, a hand may be included in the middle image, and the other hand may be included in the edge image. In this case, an image of the hand included in the middle image may serve as the second object image, and an image of the other hand included in the edge image may serve as the first object image. The processor 1300 may verify the first object image by using color information of the second object image.

The processor 1300 may execute one or more instructions configuring the noise removal module 1530 from among the programs stored in the storage 1500, to remove noise unrelated to the movement from the edge image included in the peripheral zone, based on the image of the object. By removing the noise before extracting feature points from the edge image, load of calculation may be reduced and accuracy of movement recognition may be increased. In an embodiment, as described below with reference to FIG. 8, a binarization mask may be used to remove the noise. In an embodiment, a model for removing the noise unrelated to the movement from the edge image may be preset and be stored in a DB.

The processor 1300 may execute one or more instructions configuring the feature point extraction module 1540 from among the programs stored in the storage 1500, to extract one or more feature points (or key points or key features) of the object included in the peripheral zone or the edge image.

For example, the feature points may be determined as points which are distinguishable from a background and are easily identifiable, i.e., edges of the object. In this case, the feature points may greatly differ in pixel values from neighboring pixels because they are easily distinguishable from the background. Using the above-described characteristics, the one or more feature points may be extracted from the edge image. Meanwhile, the method of extracting the one or more feature points from the image of the object included in the edge image is not limited to the above-described method, and various feature point extraction techniques in image processing, e.g., scale-invariant feature transform (SIFT), Shi-Tomasi corner detection, Harris corner detection, and features from accelerated segment test (FAST), may be used.

The processor 1300 may execute one or more instructions configuring the feature point tracking module 1550 from among the programs stored in the storage 1500, to determine movement of each feature point by tracking the extracted one or more feature points on the image sequence. In a video including a moving image, a moving object image may change over time. In an embodiment, the feature point tracking module 1550 may analyze a direction, a speed, a location change, etc. of each feature point and obtain a movement profile for each feature point by analyzing the edge image (or screen). In an embodiment, the obtained movement profile may be used to classify a movement pattern of each feature point and recognize movement of the object in subsequent operations.

The processor 1300 may execute one or more instructions configuring the movement pattern classification module 1560 from among the programs stored in the storage 1500, to classify a movement pattern based on the determined movement of each feature point. In an embodiment, using a type and the movement of each feature point, it may be determined whether movement of a specific feature point corresponds to noise or a part of movement. For example, when movement of a body part (e.g., a part of a hand) of the user is detected in the peripheral zone PZ of the FOV of the camera 1100, it may be determined whether the detected movement corresponds to misrecognized movement (i.e., noise) or movement for generating a control signal, based on a shooting angle, a speed, a direction, etc. of the body part.

In an embodiment, the processor 1300 may classify the movement pattern of each feature point based on the determined movement by using a support vector machine (SVM) or a recurrent neural network (RNN). The SVM is included in the field of machine learning and is a supervised learning model for pattern recognition, data analysis, etc. The SVM may be mainly used for classification and regression analysis. When a set of data belonging to one of two categories is given, the SVM algorithm may create a non-probabilistic binary linear classification model for determining a category to which new data belongs, based on the given set of data. The created classification model may be represented as boundaries in a space where data is mapped, and the SVM algorithm is an algorithm for finding a boundary having the largest width. The processor 1300 may classify the movement pattern of each feature point by using the SVM.

In an embodiment, the processor 1300 may execute one or more instructions configuring the movement recognition module 1570 from among the programs stored in the storage 1500, to recognize movement of the object based on the extracted one or more feature points or the classified movement pattern. In an embodiment, the movement may correspond to a control signal and the processor 1300 may control at least one of the camera 1100, the outputter 1700, or the storage 1500, based on the control signal corresponding to the recognized movement.

The RNN 1585 stored in the storage 1500 is a type of artificial neural network and may be characterized in that connections between units have a recurrent structure. The recurrent structure allows the neural network to store states to model time-variant dynamic behavior. Unlike non-recurrent neural networks, the RNN may process a sequence of inputs by using memory. Therefore, the RNN may be used to process time-variant data, for example, to classify the movement pattern or recognize the movement according to an embodiment.

The DB 1590 stored in the storage 1500 may include a set of a huge amount of data. In an embodiment, the DB 1590 may include control signal information corresponding to specific movement. In an embodiment, the DB 1590 may be used to obtain a control signal based on the recognized movement.

The processor 1300 may execute one or more instructions stored in the storage 1500, to control at least one of the camera 1100, the outputter 1700, or the storage 1500, based on the control signal corresponding to the recognized movement. In an embodiment, the movement recognized from the edge image may correspond to a simple control signal, e.g., 'next/prior', 'up/down', 'zoom-in/zoom-out', 'skip/click', or 'cancel'. In an embodiment, the processor 1300 may control the electronic device 1000 based on a complicated control signal corresponding to movement recognized from the middle image, and a simple control signal corresponding to movement recognized from the edge image.

FIG. 3A is a flowchart of a method of controlling an electronic device by recognizing movement of an object, according to an embodiment.

In operation S310, at least one image including an object may be obtained. The image may refer to a visual representation on a 2-dimensional (2D) plane. In an embodiment, the image may be obtained using a camera. For example, the obtaining of the at least one image including the object may include obtaining an image sequence including a plurality of image frames.

In operation S320, the obtained at least one image may be divided into a middle zone and a peripheral zone. In an embodiment, the dividing of the obtained at least one image into the middle zone and the peripheral zone may include dividing each of the plurality of image frames included in the obtained image sequence, into the middle zone and the peripheral zone. In an embodiment, the dividing of the obtained at least one image into the middle zone and the peripheral zone may include dividing the at least one image in the form of a rectangular grid. For example, the middle zone may include at least one middle image, and the peripheral zone may include at least one edge image.

In operation S330, one or more feature points of the object included in the peripheral zone may be extracted. In an embodiment, the extracting of the one or more feature points of the object included in the peripheral zone may include obtaining an image of the object serving as a subject of movement, from the edge image included in the peripheral zone, and extracting the one or more feature points from the obtained image of the object. In this case, for example, the obtaining of the image of the object serving as the subject of the movement, from the edge image may include obtaining a first object image from the edge image, obtaining a second object image from the middle image, verifying the first object image by using the second object image, and determining the verified first object image as the image of the object serving as the subject of the movement. For example, when the object serving as the subject of the movement includes a hand of a user of the electronic device, the obtaining of the image of the object serving as the subject of the movement, from the edge image may include obtaining the image of the object from the edge image by using a skin color model-based algorithm. In an embodiment, the extracting of the one or more feature points from the obtained image of the object may include removing noise unrelated to the movement from the edge image based on the image of the object, and extracting the one or more feature points from the edge image from which the noise has been removed. In this case, a binarization mask may be used to remove the noise.

In operation S340, movement of the object may be recognized based on the extracted one or more feature points. In an embodiment, the recognizing of the movement of the object based on the extracted one or more feature points may include determining movement of each feature point by tracking the extracted one or more feature points, classifying a movement pattern of each feature point, and recognizing the movement of the object. In this case, a SVM or a RNN may be used to classify the movement pattern.

In operation S350, the electronic device may be controlled based on the recognized movement. In an embodiment, a control signal corresponding to the recognized movement may be obtained, and the electronic device may be controlled based on the obtained control signal.

FIG. 3B is a flowchart of a method of controlling an electronic device by recognizing movement of an object, according to an embodiment.

In operation S315, an image sequence including a plurality of image frames, e.g., a video, may be obtained. The image sequence may refer to an audiovisual representation on a 2D plane. The image sequence may refer to a moving image. In an embodiment, the image sequence may be obtained using a camera. In an embodiment, the camera may include at least one of a monocular camera, a binocular camera, or an infrared camera.

In operation S325, each of the plurality of image frames may be divided into at least one middle image and at least one edge image. For example, a criterion for dividing into the middle image and the edge image may include whether an object is regarded as being included in a FOV of the camera as a whole or in its entirety. In an embodiment, when 80% or more of the object is included in the FOV of the camera, the object may be determined as being included in its entirety. In another embodiment, when 90% or 95%, or more of the object is included in the FOV of the camera, the object may be determined as being included in its entirety. For example, when the object is a hand of a user and when the entirety of a hand skeleton is included in an image and thus a posture of the hand is detectable, the image of the hand may be determined as the middle image. Alternatively, for example, when at least a part of the hand skeleton is not included in the image and thus the posture of the hand is not detectable, the image of the hand may be determined as the edge image.

In an embodiment, the dividing of each of the plurality of image frames included in the obtained image sequence into the at least one middle image and the at least one edge image may include dividing each of the plurality of image frames in the form of a rectangular grid.

In operation S335, an image of an object serving as a subject of movement may be obtained from the edge image. For example, the object serving as the subject of the movement may be a hand of a user. In this case, the image of the object serving as the subject of the movement may be obtained from the edge image by using a skin color model-based algorithm. In an embodiment, the obtaining of the image of the object serving as the subject of the movement, from the divided edge image may include obtaining a first object image from the edge image, obtaining a second object image from the middle image, and verifying the first object image by using the obtained second object image.

In operation S345, one or more feature points may be extracted from the obtained image of the object. For example, objects, each of which may serve as a subject of movement, may be divided from an image configured as continuous visual data. In an embodiment, the feature points may be determined as points which are distinguishable from a background and are easily identifiable, i.e., edges of the object, but are not limited thereto. Various feature point extraction techniques, e.g., SIFT, Shi-Tomasi corner detection, Harris corner detection, and FAST, may be used to extract the feature points.

In an embodiment, the extracting of the one or more feature points from the obtained image of the object may include removing noise unrelated to the movement from the edge image based on the image of the object, and extracting the one or more feature points from the edge image from which the noise has been removed. In this case, a binarization mask may be used to remove the noise.

In operation S355, movement of each feature point may be determined by tracking the one or more feature points. In an embodiment, the movement of each feature point may be calculated and tracked based on a change of the object image on a screen. For example, a direction, a speed, a location change, etc. of each of the extracted feature points may be analyzed and a movement profile for each feature point may be obtained by analyzing the edge image (or screen).

In operation S365, a movement pattern of each feature point may be classified based on the determined movement. In an embodiment, using a type and the movement of each feature point, it may be determined whether movement of a specific feature point corresponds to noise or a part of movement. For example, when images corresponding to a plurality of objects are included in the edge image, an object to which each feature point corresponds may be determined or a feature point with little change may be classified as noise. The movement pattern classified as noise may be excluded from a subsequent operation of recognizing movement. In an embodiment, a SVM or a RNN may be used to classify the movement pattern of each feature point based on the determined movement.

In operation S375, movement of the object may be recognized based on the classified movement pattern. In an embodiment, the movement may include a single movement or multiple movements.

In operation S385, a control signal corresponding to the recognized movement may be obtained. In an embodiment, the multi-movement may correspond to one or more control signals. In an embodiment, the movement recognized from the image of the object obtained from the edge image may correspond to a simple control signal. The simple control signal may be a signal for controlling the electronic device, e.g., 'next/prior', 'up/down', 'zoom-in/zoom-out', 'skip/click', or 'cancel'.

In operation S395, the electronic device may be controlled based on the control signal. For example, at least one of a camera, a display, an audio outputter, or a storage included in the electronic device may be controlled based on the control signal corresponding to the recognized movement.

Figure 4:
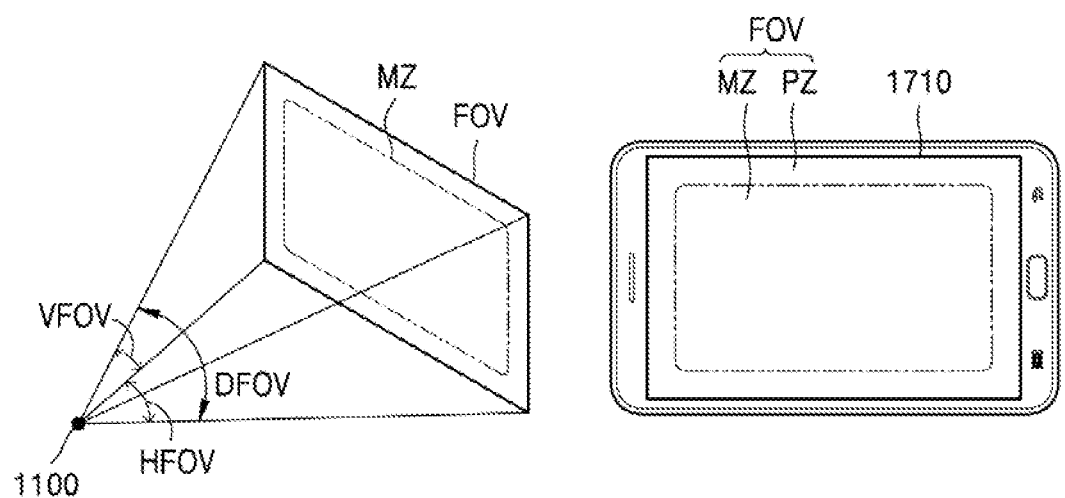
FIG. 4 is a diagram for describing a FOV of a camera and a display screen corresponding thereto, according to an embodiment.

FIG. 4 is a diagram for describing a FOV of the camera 1100 and a screen of the display 1710 corresponding thereto, according to an embodiment.

The FOV of the camera 1100 refers to 'an area that the view reaches'. The FOV may be expressed as a degree of FOV (DFOV). The DFOV may include a horizontal FOV (HFOV) and a vertical FOV (VFOV). The HFOV may refer to an angle between a left end and a right end of a scene that the camera 1100 may capture in a fixed state. The VFOV may refer to an angle between an upper end and a lower end of a scene that the camera 1100 may capture in a fixed state. The DFOV may refer to an angle between an upper left end and a lower right end of a scene that the camera 1100 may capture in a fixed state. For example, the camera 1100 having a DFOV of 90° may capture an image of a 90° area ahead.

An image or a video captured using the camera 1100 may be displayed on the screen of the display 1710. For example, a video captured in the peripheral zone PZ of the FOV of the camera 1100 may be displayed on the peripheral zone PZ of the screen of the display 1710, and a video captured in the middle zone MZ of the FOV of the camera 1100 may be displayed on the middle zone MZ of the screen of the display 1710.

The DFOV of the camera 1100 may have a constant value. Therefore, an area that the camera 1100 may photograph may be increased or reduced in proportion to a distance from the camera 1100. Therefore, an object located close to the camera 1100 may be displayed to be large on the screen of the display 1710, and an object located far from the camera 1100 may be displayed to be small on the screen of the display 1710. For example, when a user photographs his or her hand by using the camera 1100 or a HMD, the hand needs to be located away from the camera 1100 or the HMD by more than a certain distance to capture an image of the entire hand.

The camera 1100 may perform zoom-in or zoom-out. The zoom-in operation may be an operation of reducing the DFOV of the camera 1100, and the zoom-out operation may be an operation of increasing the DFOV of the camera 1100. Zoom-in and zoom-out of the camera 1100 may be performed in a range from the minimum DFOV to the maximum DFOV.

Figure 5:
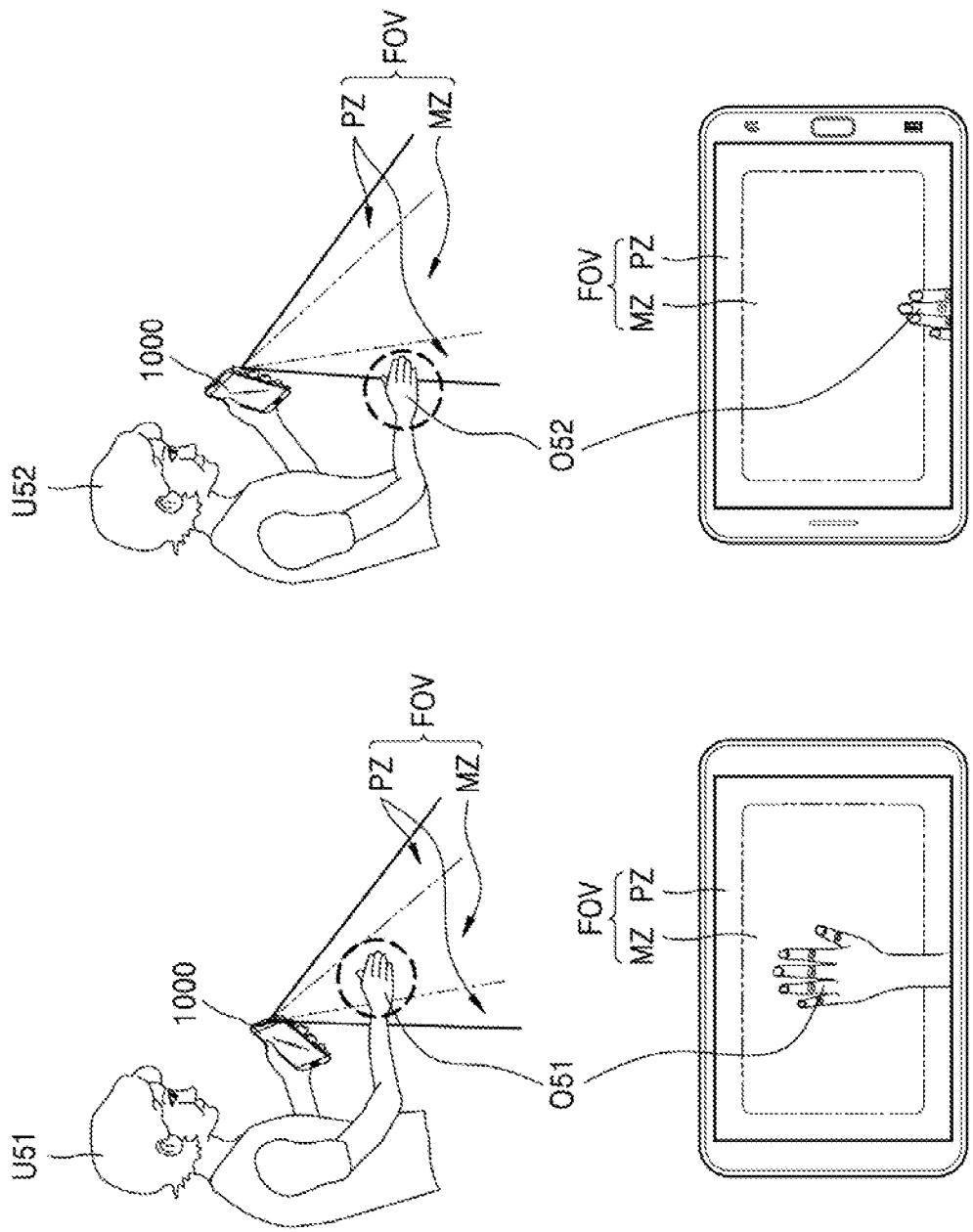
FIG. 5 is a diagram for describing a location of an object image on a display screen depending on a location of an object in a FOV of a camera, according to an embodiment.

FIG. 5 is a diagram for describing a location of an object image on a display screen depending on a location of an object in a FOV of a camera, according to an embodiment.

In an embodiment, a user U51 or U52 may photograph his or her hand O51 or O52 by using a camera included in the electronic device 1000. In this case, the object may include the hand O51 or O52 of the user U51 or U52. An object image captured using the camera included in the electronic device 1000 may be displayed in real time on a display included in the electronic device 1000.

In an embodiment, the hand O51 of the user U51 may be located in a middle zone MZ of a FOV of the camera. In this case, the entirety of the hand O51 of the user U51 may be included in the FOV of the camera, and the image of the whole hand O51 of the user U51, which is captured using the camera, may be displayed on the display screen. In this case, the image of the hand O51 may be regarded as being located in the middle zone MZ of the display screen, and serve as a middle image.

In another embodiment, the hand O52 of the user U52 may be located in a peripheral zone PZ of the FOV of the camera. In this case, at least a part of the hand O52 of the user U52 may be located outside the FOV of the camera. That is, the hand O52 of the user U52 may not be included in the FOV of the camera in its entirety. An image of the part of the hand O52 located outside the FOV of the camera is not displayed on the display screen. Therefore, an image of only a part of the hand O52 of the user U52 may be displayed on the display screen. In this case, the image of the hand O52 may be regarded as being located in the peripheral zone PZ of the display screen, and serve as an edge image.

In an embodiment, the user U51 or U52 may hold the electronic device 1000 including the camera with a hand to photograph the other hand O51 or O52. As described above in relation to FIG. 4, an area that the camera may photograph is increased in proportion to a distance from the camera, and an object image is reduced in size in inverse proportion to the distance from the camera. Therefore, in a case where the other hand O51 or O52 is photographed while fixing the hand holding the electronic device 1000 including the camera, when the other hand O51 or O52 is stretched away from the camera, a probability that the hand O51 or O52 is included in the FOV of the camera is increased. Referring to FIG. 5, a part of the hand O52 may be located outside the FOV of the camera when the user U52 puts the hand O52 (e.g., the right hand) close to the waist, and the entirety of the hand O51 may be located in the FOV of the camera when the user U51 stretches the hand O51 (e.g., the right hand) away from the body. Therefore, locating the hand O51 in the middle zone MZ of the FOV of the camera may require more energy compared to locating the hand O52 in the peripheral zone PZ of the FOV of the camera.

Figure 6:
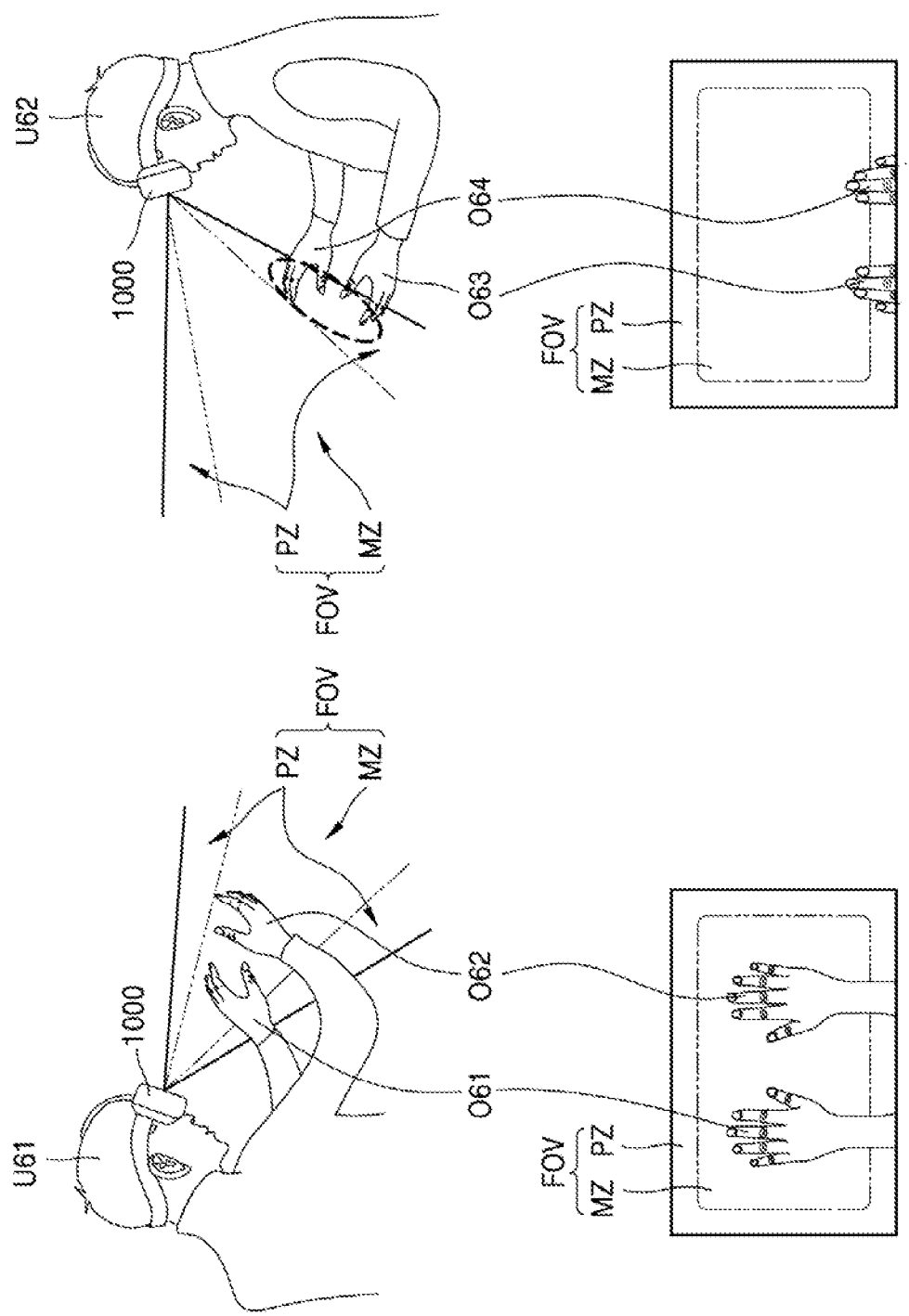
FIG. 6 is a diagram for describing a location of an object image on a display screen depending on a location of an object in a FOV of a camera, according to an embodiment.

FIG. 6 is a diagram for describing a location of an object image on a display screen depending on a location of an object in a FOV of a camera, according to an embodiment.

In an embodiment, a user U61 or U62 may photograph his or her hands O61 and O62 or O63 and O64 by using a camera included in the electronic device 1000. In this case, the object may include the hands O61 and O62 or O63 and O64 of the user U61 or U62. An object image captured using the camera included in the electronic device 1000 may be displayed in real time on a display included in the electronic device 1000.

In an embodiment, the electronic device 1000 may include a VR device worn on the head of the user U61 or U62 to provide a video related to an AR service to the user U61 or U62. In an embodiment, the electronic device 1000 may provide an AR service for outputting at least one virtual object to be overlaid on an area determined as a FOV of the user U61 or U62 (i.e., a user field of view (uFOV)). For example, the area determined as the FOV of the user U61 or U62 is an area determined as being perceivable using the electronic device 1000 by the user U61 or U62 who is wearing the electronic device 1000, and may include an area including the entirety or a part of the display of the electronic device 1000. In an embodiment, the electronic device 1000 may include a plurality of pieces of glass separately corresponding to the eyes of the user. For example, the electronic device 1000 may be configured in the form of at least one of glasses, goggles, a helmet, or a hat, but is not limited thereto.

In an embodiment, the electronic device 1000 may include the display, the camera, an audio outputter, and a support.

The camera may capture a video corresponding to the FOV of the user U61 or U62, or measure a distance to an object. In an embodiment, in addition to the camera used to capture a video corresponding to the FOV of the user U61 or U62, that is, to extract movement of the hands of the user, or used for space recognition, the camera may further include an 'eye tracking (ET) camera'. In an embodiment, the ET camera may be used to extract and track the pupils of the user U61 or U62. The ET camera may be used to control the center of a virtual video based on a direction that the pupils of the user U61 or U62 face.

In an embodiment, a virtual object output on the display may include information related to an application program executed in the electronic device 1000, or information related to an external object located in a real space corresponding to the area determined as the FOV of the user U61 or U62. For example, the electronic device 1000 may check an external object included in at least a part of the area determined as the FOV of the user U61 or U62, in video data obtained using the camera and related to the real space. The electronic device 1000 may output a virtual object related to the external object checked in at least a part of the area, on an area determined as the FOV of the user U61 or U62 in a display area of the electronic device 1000. The external object may include an object present in the real space.

In an embodiment, the display may include a condensing lens or a transparent waveguide on the glass. The waveguide may transfer light generated by a light source of the display, to the eyes of the user U61 or U62. For example, the transparent waveguide may be at least partially located in a part of the glass. According to an embodiment, light emitted from the display may be incident on an end of the glass, and the incident light may be transferred to the user U61 or U62 through the waveguide provided in the glass. The waveguide may be made of glass, plastic, or polymer, and include a nano-pattern, e.g., a polygonal or curved grating structure, provided on an internal or external surface thereof. In an embodiment, the incident light may be propagated or reflected in the waveguide by the nano-pattern and be provided to the user U61 or U62. In an embodiment, the waveguide may include at least one of at least one diffractive element (e.g., a diffractive optical element (DOE) or a holographic optical element (HOE)) or at least one reflective element (e.g., a mirror). In an embodiment, the waveguide may induce the light emitted from the light source of the display toward the eyes of the user U61 or U62 by using the at least one diffractive element or reflective element.

In an embodiment, the display may include a display panel or a lens (e.g., glass). For example, the display panel may include a transparent material such as glass or plastic. In an embodiment, the display may be configured as a transparent device, and the user U61 or U62 may perceive the real space behind the display through the display. The display may display a virtual object on at least a partial area of the transparent device such that the virtual object is viewed to the user U61 or U62 as being overlaid on at least a part of the real space.

In an embodiment, the support may include a printed circuit board (PCB) for transmitting an electrical signal to each element of the electronic device 1000, a speaker for outputting an audio signal, or a battery for supplying power. The speaker may include a first speaker for transmitting an audio signal to the left ear of the user U61 or U62, and a second speaker for transmitting an audio signal to the right ear of the user U61 or U62. In an embodiment, the speaker may be included in the audio outputter 1720 of FIG. 2.

In an embodiment, the hands O61 and O62 of the user U61 may be located in a middle zone MZ of a FOV of the camera. In this case, the entirety of the hands O61 and O62 of the user U61 may be included in the FOV of the camera, and the image of the entirety of the hands O61 and O62 of the user U61, which is captured using the camera, may be displayed on the display screen. In this case, the image of the hands O61 and O62 may be regarded as being located in the middle zone MZ of the display screen, and serve as a middle image.

In another embodiment, the hands O63 and O64 of the user U62 may be located in a peripheral zone PZ of the FOV of the camera. In this case, at least parts of the hands O63 and O64 of the user U62 may be located outside the FOV of the camera, that is, the hands O63 and O64 of the user U62 may not be included in their entirety in the FOV of the camera. An image of the parts of the hands O63 and O64 located outside the FOV of the camera is not displayed on the display screen. Therefore, an image of only parts of the hands O63 and O64 of the user U62 may be displayed on the display screen. In this case, the image of the hands O63 and O64 may be regarded as being located in the peripheral zone PZ of the display screen, and serve as an edge image.

In an embodiment, the user U61 or U62 may wear the electronic device 1000 including the camera on the head to photograph his or her both hands O61 and O62, or O63 and O64. As described above in relation to FIG. 4, an area that the camera may photograph is increased in proportion to a distance from the camera, and an object image is reduced in size in inverse proportion to the distance from the camera. Therefore, in a case where both hands O61 and O62, or O63 and O64 are photographed using the electronic device 1000 worn on the head and including the camera, when both hands O61 and O62, or O63 and O64 are stretched away from the camera, a probability that the hands O61 and O62, or O63 and O64 are included in the FOV of the camera is increased. Referring to FIG. 6, parts of both hands O63 and O64 may be located outside the FOV of the camera when the user U62 easily puts both hands O63 and O64 close to the waist, and the entirety of both hands O61 and O62 may be located in the FOV of the camera when the user U61 stretches both hands O61 and O62 away from the body. Therefore, locating both hands O61 and O62 in the middle zone MZ of the FOV of the camera may require more energy compared to locating both hands O63 and O64 in the peripheral zone PZ of the FOV of the camera.

Figure 7:
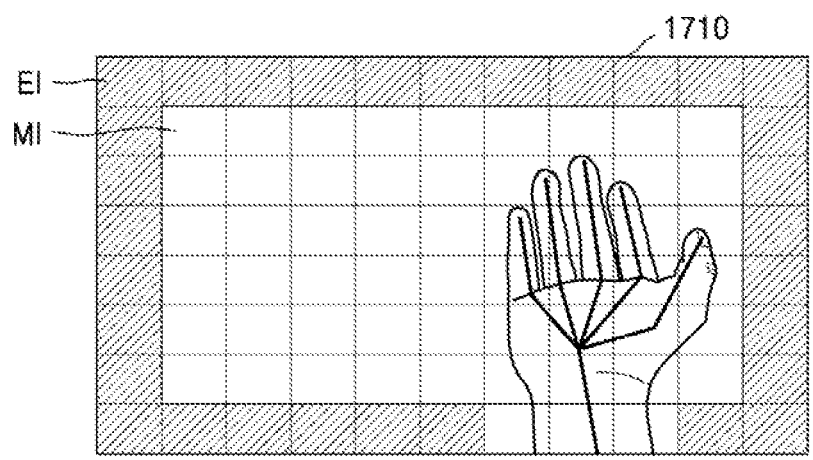
FIG. 7 is a diagram for describing an operation of dividing an image frame into a middle image and an edge image, according to an embodiment.

FIG. 7 is a diagram for describing an operation of dividing an image frame into a middle image MI and an edge image EI, according to an embodiment.

In an embodiment, the dividing of the image into the middle zone and the peripheral zone, or the dividing of each of the plurality of image frames included in the image sequence, into at least one middle image MI and at least one edge image EI may include dividing the at least one image or each of the plurality of image frames in the form of a rectangular grid. Referring to FIG. 7, each of segments cut in the form of the rectangular grid may be classified as the middle image MI or the edge image EI. For example, segments, at least one corner of which is in contact with the edge of a screen of the display 1710, may serve as the edge image EI.

Referring to FIG. 7, an image of an object may be displayed over segments on the edge and in the middle of the screen of the display 1710. In this case, it may be determined whether the segments including the image of the object belong to the middle image MI or the edge image EI, based on whether the image of the whole object is displayed.

For example, referring to FIG. 7, the object is a hand and an image of the hand may include the entirety of a hand skeleton. In this case, the hand image may serve as a middle image, and all segments including the hand image may be determined as the middle image MI.

In an embodiment, the image of the hand may not include at least a part of the hand skeleton. In this case, the hand may be located in a peripheral zone PZ of a FOV of a camera, and all segments including the partial hand image may be determined as the edge image EI.

The dividing of the image frame into the middle image MI and the edge image EI is not limited to the afore-described embodiment.

Figure 8:
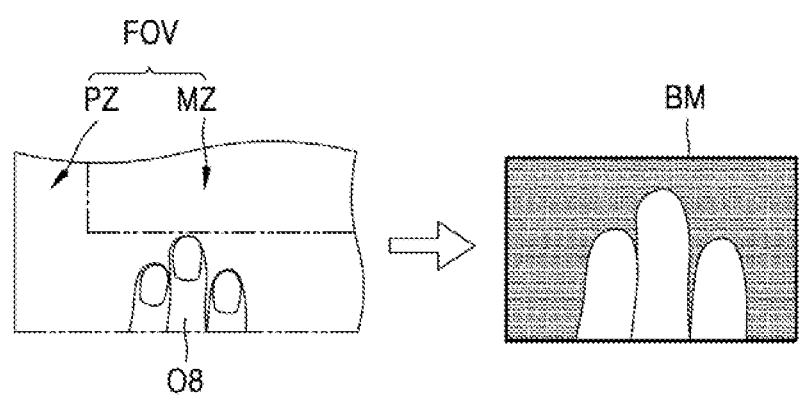
FIG. 8 is a diagram for describing an operation of removing noise unrelated to movement from an edge image, according to an embodiment.

FIG. 8 is a diagram for describing an operation of removing noise unrelated to movement from an edge image, according to an embodiment.

In an embodiment, the extracting of the one or more feature points from the image of the object may further include removing noise unrelated to movement from the edge image included in the peripheral zone of the image, based on the image of the object, before extracting the feature points. In an embodiment, a determined edge image EI may include an object image O8 and further include a background image. Referring to FIG. 8, the edge image of the peripheral zone PZ may include an object image O8 and further include an image other than the object image O8.

Feature point extraction from a background image is not required to recognize movement of an object, and feature point tracking on the background image may reduce accuracy of movement recognition. Therefore, in an embodiment, before feature point extraction, the background image unrelated to the movement may be removed as noise.

In an embodiment, a binarization mask BM may be used to remove the noise. Image binarization refers to an operation of representing all pixels of an image as black and white (i.e., 0 and 1). Binarization refers to an operation of converting a pixel having a value lower than a preset threshold, into black (i.e., 0) and converting a pixel having a value higher than the preset threshold, into white (i.e., 1). There-fore, the binarization mask BM for performing binarization may be used to extract an object included in an image.

Referring to FIG. 8, in an embodiment, noise not corresponding to the object image O8 may be removed by setting a threshold corresponding to the object image O8, generating a binarization mask BM having the set threshold, and applying the generated binarization mask to the edge image. The removing of the noise from the edge image is not limited to the above described method using the binarization mask BM.

Figure 9:
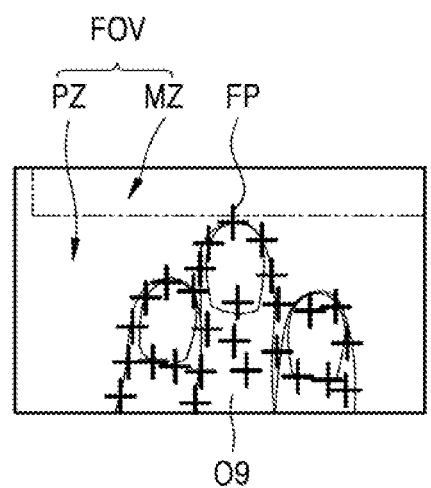
FIG. 9 is a diagram for describing an operation of extracting one or more feature points from an object image, according to an embodiment.

FIG. 9 is a diagram for describing an operation of extracting one or more feature points FP from an object image O9, according to an embodiment.

The feature points FP may refer to points which are distinguishable from a background and are easily identifiable within the object image O9, or points capable of easily tracking the object image O9. Various feature point extraction techniques in image processing, e.g., SIFT, Shi-Tomasi corner detection, Harris corner detection, and FAST, may be used to extract the feature points. Referring to FIG. 9, the feature points FP extracted within the object image O9 may be located on easily-trackable points, e.g., the edges of fingers, the edges of fingernails, or moles or wrinkles on the fingers. The extracted feature points FP may be used to track changes of the object within the image sequence over time. For example, unlike hand skeleton extraction, hand feature point extraction may be performed using only a part of a hand image and does not require an image of the entirety of the hand.

FIGS. 10A to 10J are diagrams for describing a control signal corresponding to a gesture (or movement) of an object located in a peripheral zone PZ of a FOV of a camera, according to various embodiments.

In an embodiment, a gesture (or movement) recognized based on movement of an object included in an edge image may correspond to a control signal for controlling an electronic device. An image of the whole object included in the edge image may not be displayed and only a part thereof may be displayed. Therefore, compared to movement recognized from a middle image, the movement recognized from the edge image may correspond to a simple control signal. In an embodiment, the movement recognized from the edge image may correspond to a simple control signal, e.g., 'next/prior', 'up/down', 'zoom-in/zoom-out', 'skip/click', or 'cancel'.

Figure 10A:
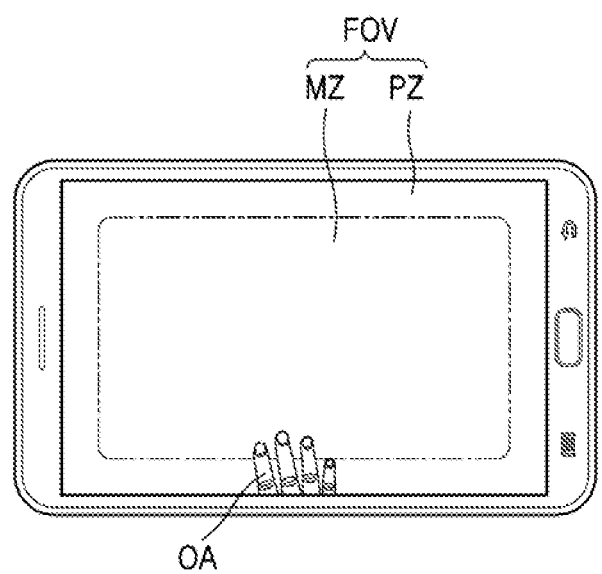
FIGS. 10A to 10J are diagrams for describing a control signal corresponding to movement of an object located in a peripheral zone of a FOV of a camera, according to various embodiments of the disclosure.

Referring to FIG. 10A, a 'tap gesture' may be recognized from an object image OA included in an edge image. For example, the 'tap gesture' may be recognized when a hand quickly appears and then disappears or quickly appears and then pauses within a screen. In an embodiment, the 'tap gesture' may correspond to a control signal such as 'click' or 'enter'.

Figure 10B:
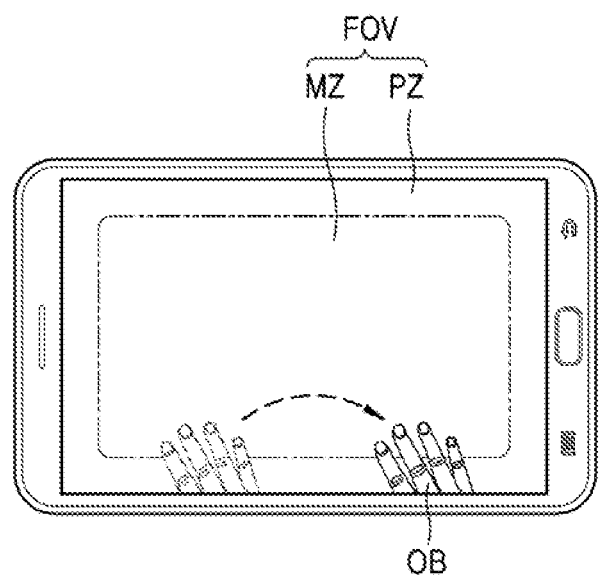

Referring to FIG. 10B, a 'prior gesture' made by moving a hand in a rightward direction may be recognized from an object image OB included in an edge image. For example, the 'prior gesture' may be recognized when a hand moves from a left side to a right side within a screen. In an embodiment, the 'prior gesture' may correspond to a control signal such as 'prior' or 'move right'.

Figure 10C:
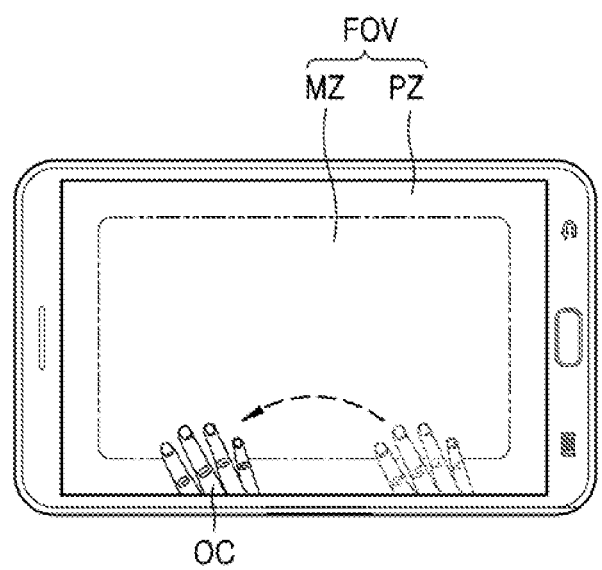

Referring to FIG. 10C, a 'next gesture' made by moving a hand in a leftward direction may be recognized from an object image OC included in an edge image. For example, the 'next gesture' may be recognized when a hand moves from a right side to a left side within a screen. In an embodiment, the 'next gesture' may correspond to a control signal such as 'next' or 'move left'.

Figure 10D:
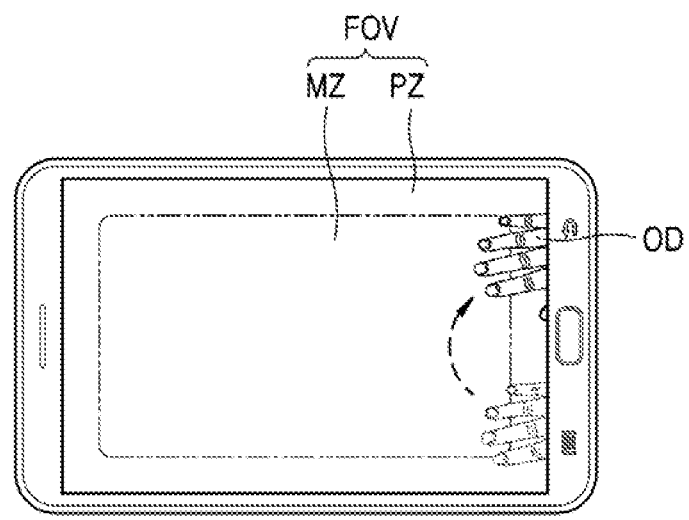

Referring to FIG. 10D, a 'scroll up gesture' made by moving a hand in an upward direction may be recognized from an object image OD included in an edge image. For example, the 'scroll up gesture' may be recognized when a hand moves from a lower side to an upper side within a screen. In an embodiment, the 'scroll up gesture' may correspond to a control signal such as 'next', 'scroll up', or 'move up'.

Figure 10E:
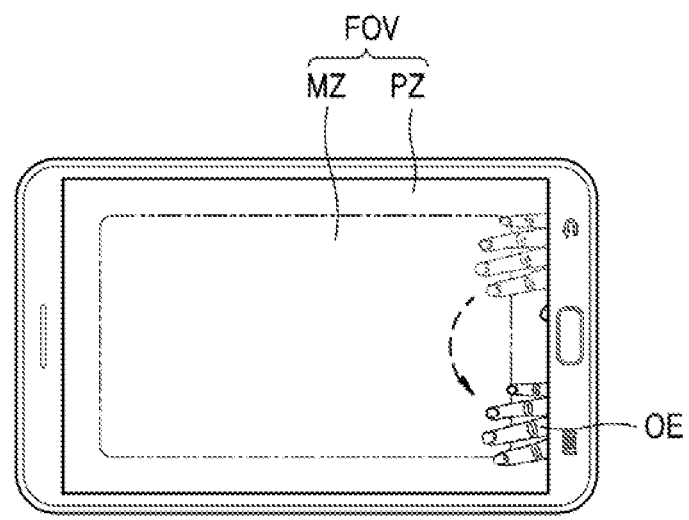

Referring to FIG. 10E, a 'scroll down gesture' made by moving a hand in a downward direction may be recognized from an object image OE included in an edge image. For example, the 'scroll down gesture' may be recognized when a hand moves from an upper side to a lower side within a screen. In an embodiment, the 'scroll down gesture' may correspond to a control signal such as 'prior', 'scroll down', or 'move down'.

Figure 10F:
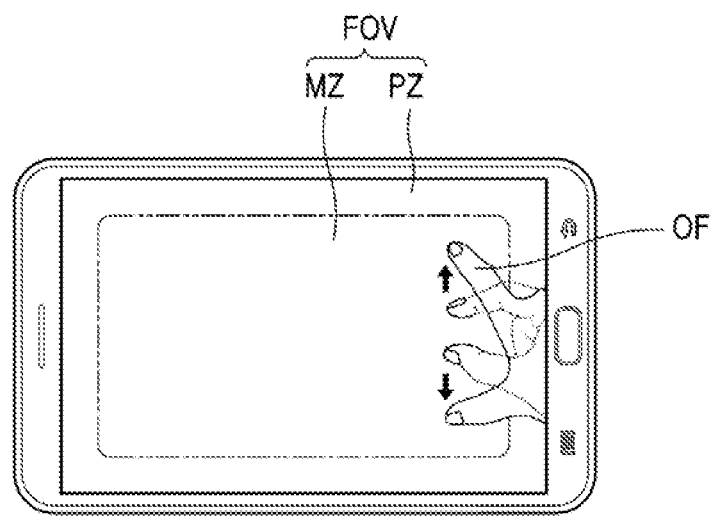

Referring to FIG. 10F, a 'zoom-in gesture' made by spreading two fingers apart may be recognized from an object image OF included in an edge image. For example, the 'zoom-in gesture' may be recognized when two fingers move away from each other within a screen. In an embodiment, the 'zoom-in gesture' may correspond to a control signal such as 'zoom-in' or 'send'.

Figure 10G:
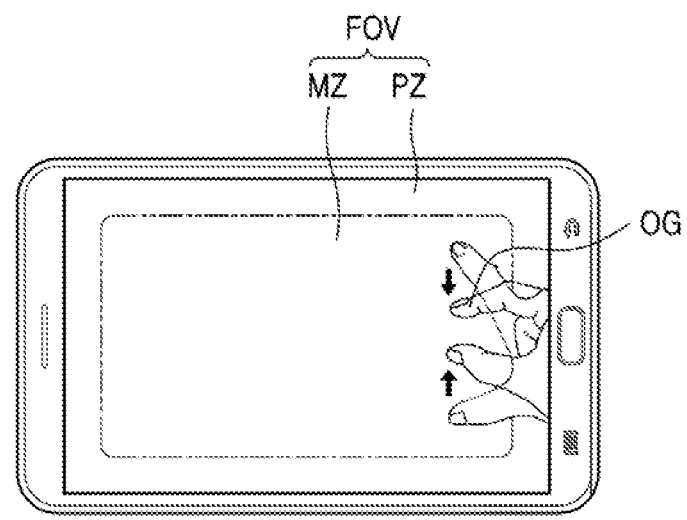

Referring to FIG. 10G, a 'zoom-out gesture' made by bring two fingers together may be recognized from an object image OG included in an edge image. For example, the 'zoom-out gesture' may be recognized when two fingers move toward each other within a screen. In an embodiment, the 'zoom-out gesture' may correspond to a control signal such as 'zoom-out', 'mute', 'bring', 'select', or 'click'. In an embodiment, the gesture may correspond to different control signals depending on a speed of movement. For example, the zoom-out gesture may be configured to correspond to a control signal such as 'click', 'select', or 'mute' when the speed thereof is greater than a preset value, or to correspond to a control signal such as 'zoom-out' or 'bring' when the speed thereof is less than the preset value.

Figure 10H:
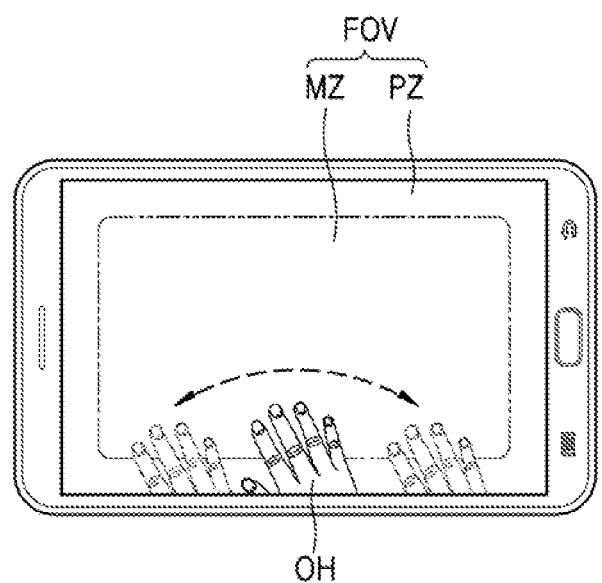

Referring to FIG. 10H, a 'delete gesture' made by moving a hand in a horizontal direction may be recognized from an object image OH included in an edge image. For example, the 'delete gesture' may be recognized when a hand alternately moves from a right side to a left side and from the left side to the right side within a screen. In an embodiment, the 'delete gesture' may correspond to a control signal such as 'erase' or 'delete'.

Figure 10I:
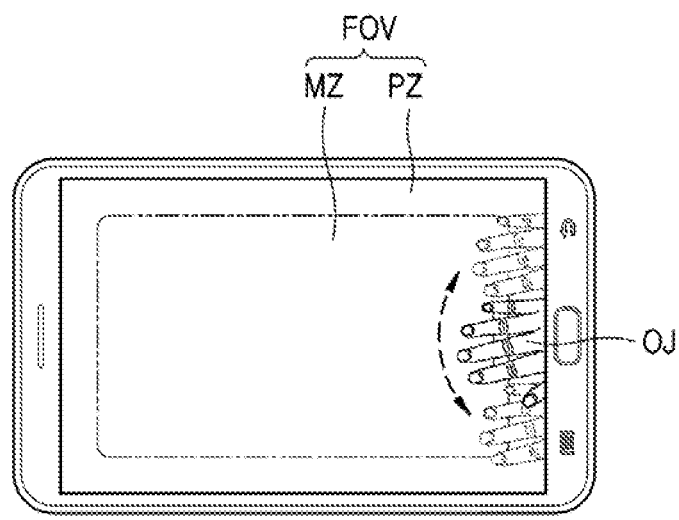

Referring to FIG. 10I, a 'delete gesture' made by moving a hand in a vertical direction may be recognized from an object image OJ included in an edge image. For example, the 'delete gesture' may be recognized when a hand alternately moves from a lower side to an upper side and from the upper side to the lower side within a screen. In an embodiment, the 'delete gesture' may correspond to a control signal such as 'erase' or 'delete'.

Figure 10J:
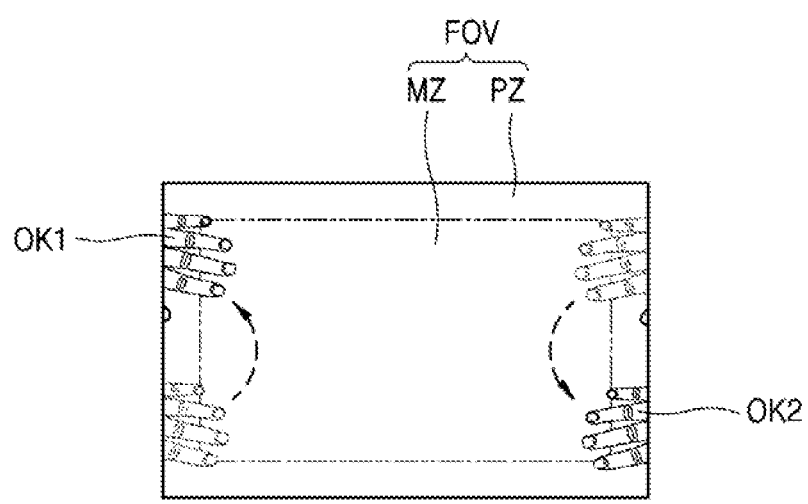

Referring to FIG. 10J, a 'rotate gesture' may be recognized from object images OK1 and OK2 included in an edge image. For example, the 'rotate gesture' may be recognized from two object images OK1 and OK2 included in a screen. For example, the 'rotate gesture' may be recognized when the first object image OK1 moves from a lower side to an upper side in a peripheral zone PZ at a left side of the screen, and the second object image OK2 moves from an upper side to a lower side in the peripheral zone PZ at a right side of the screen. In an embodiment, the 'rotate gesture' may correspond to a control signal such as 'rotate'.

Figure 11:
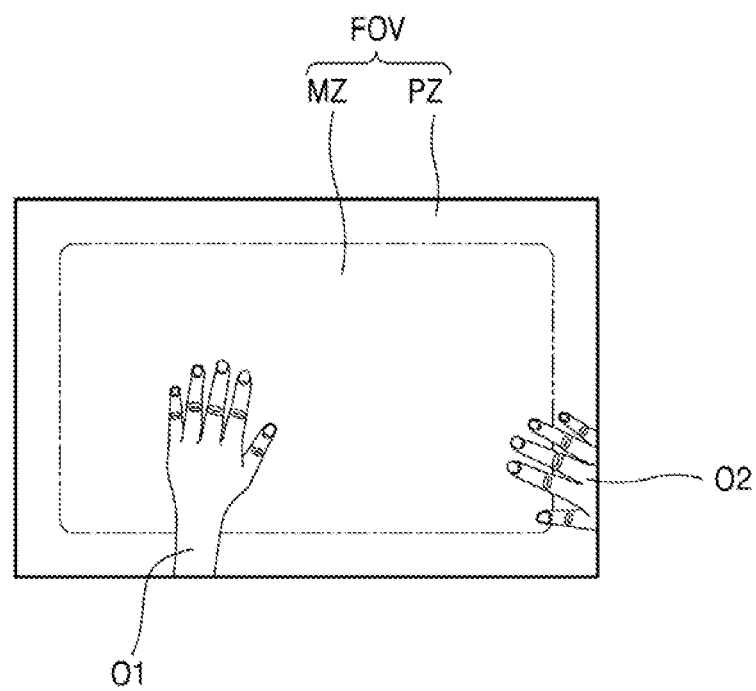
FIG. 11 is a diagram for describing a method of recognizing multi-movement, according to an embodiment.

FIG. 11 is a diagram for describing a method of recognizing multi-movement, according to an embodiment.

A case where multi-movement is included refers to a case where an image or an image sequence includes a plurality of movements due to a plurality of objects. The case where multi-movement is included may occur when both hands of a user are free, for example, when a VR device such as glasses or a HMD is used or when an electronic device is fixed by a holder, but is not limited to the above-described example. When multi-movement is included, for example, a plurality of objects O1 and O2 may be present in one image of the image sequence and the objects O1 and O2 may have different movements. In this case, the movements of the objects O1 and O2 may serve as different gestures.

In an embodiment, at least one object image may be included in a middle image, and at least one other object image may be included in an edge image. At this time, within one image, the object image included in the middle image may be an image of the first object O1, and the object image included in the edge image may be an image of the second object O2.

Referring to FIG. 11, when both hands of the user serve as objects, a hand serves as the first object O1, the image of which is included in the middle image, and the other hand serves as the second object O2, the image of which is included in the edge image. A gesture of the first object O1 may serve as first movement, and a gesture of the second object O2 may serve as second movement. In an embodiment, at least one first movement and at least one second movement may be mapped to control signals of the electronic device one-to-one, many-to-one, or many-to-many. For example, referring to FIG. 11, the first movement of the first object O1 and the second movement of the second object O2 may correspond to one control signal or different control signals.

Figure 12:
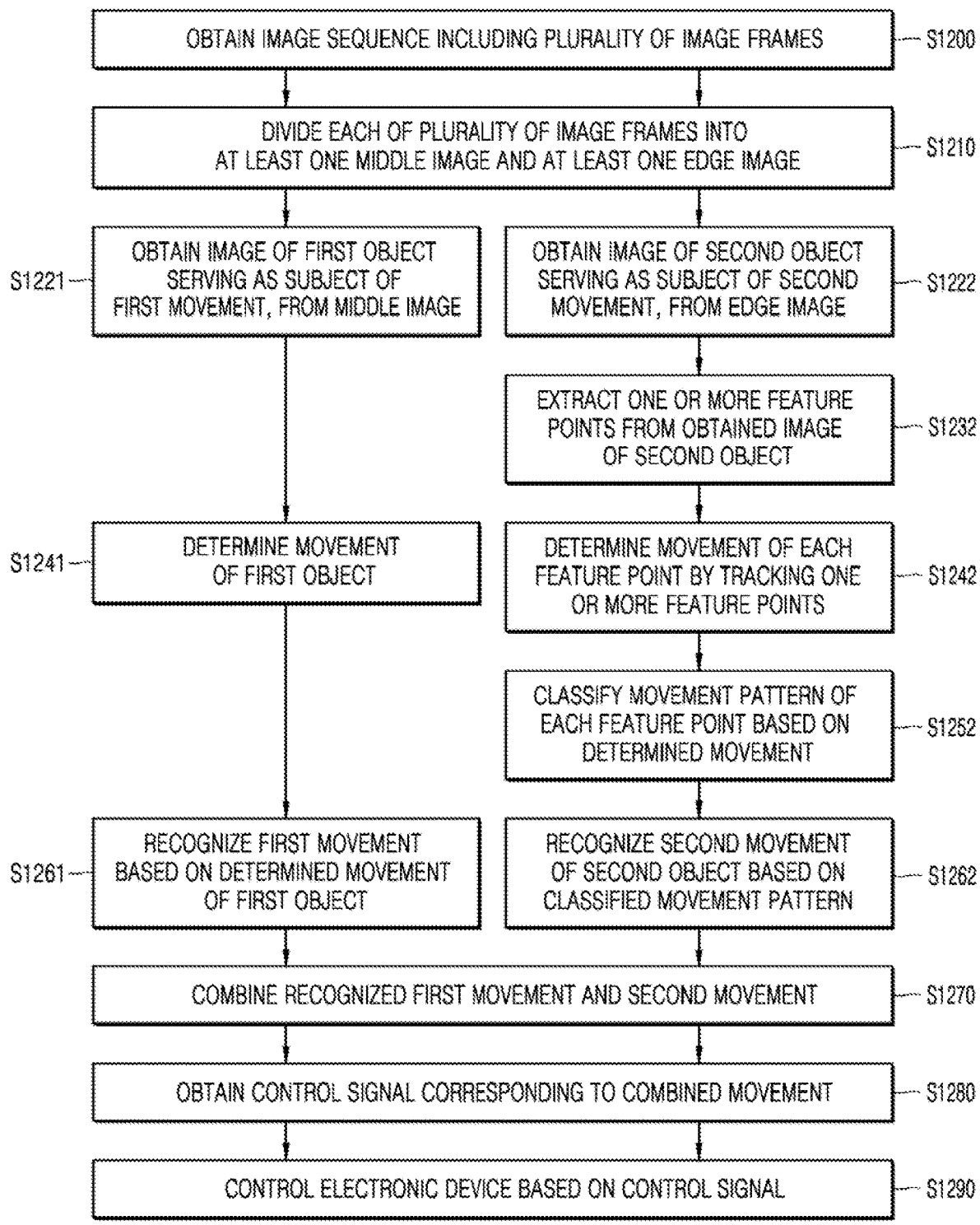
FIG. 12 is a flowchart of a method of controlling an electronic device by recognizing multi-movement in a FOV of a camera, according to an embodiment.

FIG. 12 is a flowchart of a method of controlling an electronic device by recognizing multi-movement in a FOV of a camera, according to an embodiment.

The method of controlling the electronic device by recognizing multi-movement, according to an embodiment, may include obtaining at least one image, dividing the obtained at least one image into a middle zone and a peripheral zone, recognizing movement of a first object included in the middle zone, recognizing movement of a second object included in the peripheral zone, and controlling the electronic device based on the movement of the first object and the movement of the second object. In this case, the recognizing of the movement of the second object may include extracting one or more feature points of the second object, and recognizing the movement of the second object based on the extracted one or more feature points.

In an embodiment, the controlling of the electronic device based on the movement of the first object and the movement of the second object may include combining the movement of the first object and the movement of the second object, and controlling the electronic device based on the combined movement.

Operations S1200, S1210, S1222, S1232, S1242, S1252, S1262, S1280, and S1290 of FIG. 12 may be performed similarly to operations S315, S325, S335, S345, S355, S365, S375, S385, and S395 of FIG. 3B.

In an embodiment, the obtaining of the at least one image may include obtaining an image sequence including a plurality of image frames. In an embodiment, the dividing of the obtained at least one image into the middle zone and the peripheral zone may include dividing each of the plurality of image frames included in the obtained image sequence, into the middle zone and the peripheral zone. For example, the middle zone may include at least one middle image, and the peripheral zone may include at least one edge image.

Similarly to operations S315 and S325 of FIG. 3B, in operations S1200 and S1210, an image sequence including a plurality of image frames may be obtained and each of the plurality of image frames may be divided into at least one middle image and at least one edge image.

In an embodiment, the recognizing of the movement of the first object included in the middle zone and the recognizing of the movement of the second object included in the peripheral zone may include, for example, recognizing at least one first movement from the at least one middle image and recognizing at least one second movement from the at least one edge image. The recognizing of the at least one first movement from the at least one middle image may be performed through operations S1221, S1241, and S1261. The recognizing of the at least one second movement from the at least one edge image may be performed through operations S1222, S1232, S1242, S1252, and S1262.

In operations S1221, S1241, and S1261, the recognizing of the at least one first movement from the middle image, i.e., the recognizing of the movement of the first object included in the middle zone, may include obtaining an image of the first object serving as a subject of the first movement, from the divided middle image, determining the movement of the first object, and recognizing the first movement based on the determined movement of the first object.

In operation S1221, the image of the first object serving as the subject of the first movement may be obtained from the middle image. In an embodiment, a neural network (NN) or a DB (DB) may be used to obtain the image of the first object.

In operation S1241, the movement of the first object may be determined. In an embodiment, an AI model, a RNN, or a DB may be used to determine the movement of the first object. For example, when the first object is a hand of a user, 'hand skeleton detection and tracking' may be used to determine the movement of the first object.

Hand skeleton detection and tracking is a technology for detecting moving joints on an image of a human hand and analyzing and overlaying predetermined skeleton structures thereon. In an embodiment, the human hand skeleton may include points corresponding to (5) fingertips, (5*3=15) finger joints, and (1) palm, but is not limited thereto. When hand skeleton detection and tracking is used to determine the movement of the first object, accurate skeleton detection is required. The image of the first object included in the middle image is an image including the whole object and may include the entirety of the skeleton, and thus accuracy of posture recognition may be high.

In operation S1261, the first movement may be recognized based on the determined movement of the first object. In an embodiment, an image-trained DB may be used to recognize the first movement.

In operations S1222, S1232, S1242, S1252, and S1262, the recognizing of the at least one second movement from the edge image, i.e., the recognizing of the movement of the second object included in the peripheral zone, may include obtaining an image of the second object serving as a subject of the second movement, from the divided edge image, extracting one or more feature points from the image of the second object, determining movement of each feature point by tracking the one or more feature points, classifying a movement pattern of each feature point based on the determined movement, and recognizing the second movement of the second object based on the classified movement pattern. The recognizing of the at least one second movement from the edge image is described in detail above in relation to FIG. 3B and thus a detailed description thereof is not provided herein.

Through operations S1270, S1280, and S1290, the electronic device may be controlled based on the recognized movement of the first object and the recognized movement of the second object. For example, the movement of the first object may be the first movement, and the movement of the second object may be the second movement.

In operation S1270, the at least one first movement and the at least one second movement may be combined. In an embodiment, a single integrated movement may be generated by integrating the at least one first movement and the at least one second movement, or a movement group including a plurality of movements may be generated without integrating them.

In an embodiment, a rule-based solution or multimodal fusion may be used to combine the at least one first movement and the at least one second movement. The rule-based solution may be a type of an AI model, and the multimodal fusion may refer to a recognition-based technology for analyzing and encoding information about natural behavior of a human, e.g., gestures, gaze, hand movements, behavior patterns, voice, or physical locations. That is, when the multimodal fusion is used, a plurality of objects on an image may be mapped to a plurality of modalities, and may operate as different channels for applying different control signals to the electronic device.

In operation 1280, a control signal corresponding to the recognized movement may be obtained. In an embodiment, when the at least one first movement and the at least one second movement correspond to one control signal, one control signal may be obtained based on the integrated movement generated by integrating the first and second movements. In an embodiment, when the at least one first movement and the at least one second movement correspond to different control signals, a plurality of control signals may be obtained based on the movement group including the first and second movements.

In operation S1290, the electronic device may be controlled based on the obtained control signal. In an embodiment, at least one of a camera, an outputter, a storage, or a processor of the electronic device may be controlled based on the control signal.

Figure 13:
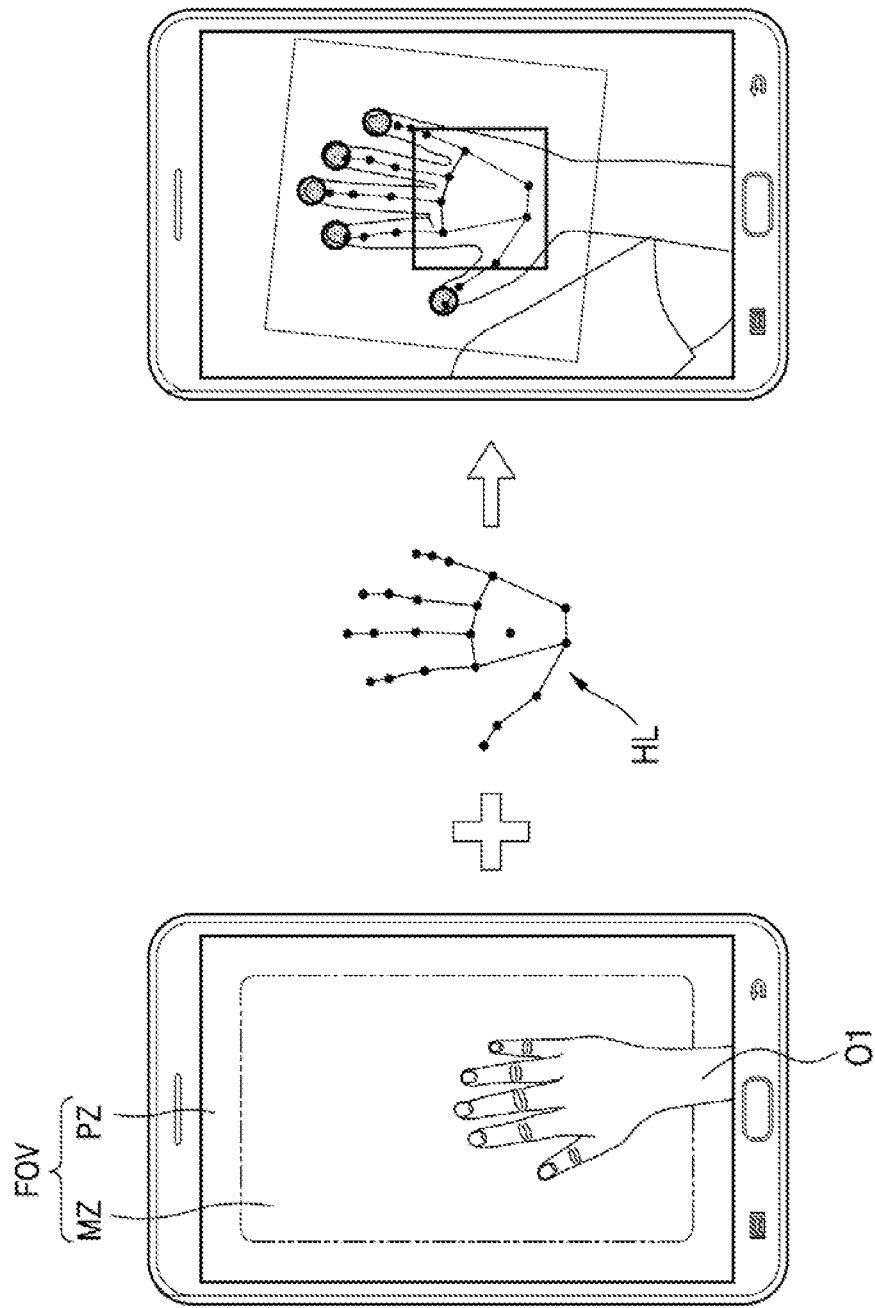
FIG. 13 is a diagram for describing an operation of recognizing movement of an object located in a middle zone of a FOV of a camera, in a method of recognizing multi-movement, according to an embodiment.

FIG. 13 is a diagram for describing an operation of recognizing movement of a first object O1 located in a middle zone MZ of a FOV of a camera, in a method of recognizing multi-movement, according to an embodiment.

Referring to FIG. 13, in an embodiment, the first object O1 may be located in the middle zone MZ of the FOV of the camera. In this case, the entirety of the first object O1 may be included in the FOV of the camera, and an image of the entirety of the first object O1 may be included in an image area of a display screen. Therefore, an image of the first object O1 serving as a subject of first movement may be obtained from a middle image.

Hand skeleton detection and tracking may be used to determine movement of the first object O1 corresponding to a hand of a user. Referring to FIG. 13, a hand landmark HL may include 22 structural points corresponding to fingertips, joints, and a palm. In an embodiment, to determine the movement of the first object O1, moving joints may be detected on the image of the first object O1 and be mapped to the hand landmark HL. Then, the movement of the first object O1 may be determined by tracking the structural points of the hand landmark HL mapped on the image of the first object O1. In an embodiment, the first movement may be recognized based on the determined movement of the first object O1.

Figure 14:
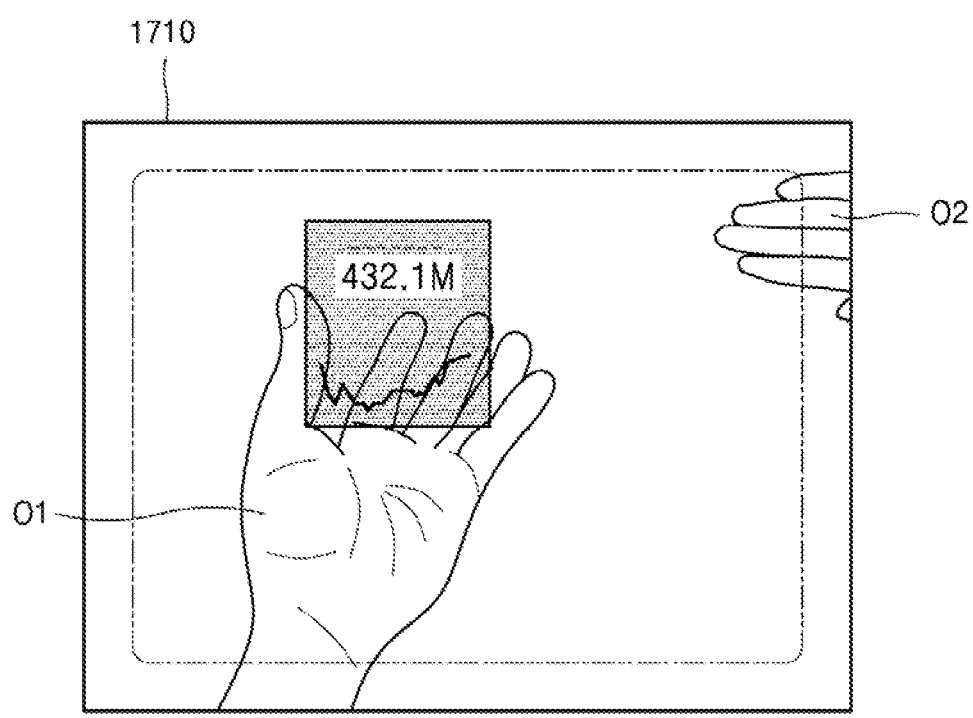
FIG. 14 is a diagram for describing a control signal corresponding to multi-movement, according to an embodiment.

FIG. 14 is a diagram for describing a control signal corresponding to multi-movement, according to an embodiment.

In an embodiment, the electronic device 1000 may display a virtual object related to an AR service based on video data obtained using a camera and related to a real space. For example, referring to FIG. 14, the electronic device 1000 may display the virtual object such as a 'popup screen' based on the video data related to the real space (e.g., images of both hands O1 and O2 of a user, and a background).

In an embodiment, the first object O1 included in a middle image and the second object O2 included in an edge image may be displayed on the display 1710. In this case, first movement may be recognized from an image of the first object O1, and second movement may be recognized from an image of the second object O2. In an embodiment, the first movement recognized from the middle image may correspond to a complicated control signal. For example, referring to FIG. 14, the first movement which is movement of the first object O1 may correspond to a control signal for adjusting a size, a location, or an angle of a 'data display area'.

In an embodiment, the second movement recognized from the edge image may correspond to a simple control signal. For example, referring to FIG. 14, only a part of the second object O2 may be displayed on a screen area of the display 1710, movement of the second object O2 may serve as the second movement. A control signal corresponding to the second movement may be a simple control signal for turning pages of the 'data display area' controlled based on the first movement.

In an embodiment, movement of an object may be accurately recognized in a peripheral zone of a FOV of a camera, where an image of at least a part of the object is not obtained, by using 'feature point extraction and tracking'. In addition, an electronic device may be controlled based on a different control signal depending on a location of an object in a FOV of a camera, and the FOV of the camera may be efficiently used, by assigning a different control signal to each movement based on a type of the movement and the location of the object serving as a subject of the movement in the FOV of the camera.

An embodiment may be implemented in the form of a recording medium including instructions executable by a computer, e.g., a program module executed by the computer. A computer-readable medium may be an arbitrary available medium that can be accessed by the computer, and examples thereof include all of volatile, non-volatile, detachable, and non-detachable media. The computer-readable medium may include a computer storage medium and a communication medium. Examples of the computer storage medium include all of volatile, non-volatile, detachable, and non-detachable media implemented using an arbitrary method or technology for storing information such as computer-readable instructions, data structures, program modules, or other data. The communication medium may typically include computer-readable instructions, data structures, program modules, or other data in modulated data signals.

The computer-readable storage medium may be provided in the form of a non-transitory storage medium. When the storage medium is 'non-transitory', it means that the storage medium is tangible and does not include signals (e.g., electromagnetic waves), and it does not limit that data is semi-permanently or temporarily stored in the storage medium. For example, the 'non-transitory storage medium' may include a buffer for temporarily storing data.

According to an embodiment, the method according to the various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be electronically distributed (e.g., downloaded or uploaded) via an application store (e.g., Play Store™) or directly between two user devices (e.g., smartphones). For electronic distribution, at least a part of the computer program product may be temporarily generated or be at least temporarily stored in a machine-readable storage medium such as a memory of a server of a manufacturer, a server of an application store, or a relay server.

The above descriptions of the disclosure are provided for the purpose of illustration, and it will be understood by one of ordinary skill in the art that various changes in form and details may be made therein without departing from the scope of the disclosure. Therefore, it should be understood that the afore-described embodiments should be considered in a descriptive sense only and not for purposes of limitation. For example, each component described to be of a single type can be implemented in a distributed manner and, likewise, components described as being distributed can be implemented in a combined manner.

The scope of the disclosure is defined by the following claims rather than by the detailed description, and it should be understood that all modifications from the claims and their equivalents are included in the scope of the disclosure.

The invention claimed is:

1. A method of controlling an electronic device by recognizing movement of an object within a peripheral zone of field of view (FOV) of a camera, the method comprising:
    obtaining, through the camera, at least one image comprising an image of the object;
    dividing the obtained at least one image into a middle zone and a peripheral zone, wherein the middle zone comprises at least one middle image, and the peripheral zone comprises at least one edge image;
    obtaining a first object image from the at least one edge image;
    obtaining a second object image from the at least one middle image;
    verifying the first object image by using the second object image;
    determining the verified first object image as the image of the object serving as a subject of the movement;
    extracting one or more feature points of the object that are within the peripheral zone from the image of the object serving as a subject of the movement;
    recognizing a movement pattern of the object from among a plurality of movement patterns based on the extracted one or more feature points;
    identifying an instruction corresponding to the recognized movement pattern of the object within the peripheral zone; and
    controlling the electronic device based on the identified instruction.

2. The method of claim 1, wherein the extracting of the one or more feature points from the obtained image of the object comprises:
    removing noise unrelated to the movement of the object from the at least one edge image; and extracting the one or more feature points from the at least one edge image from which the noise has been removed.

3. The method of claim 2, wherein the noise is removed using a binarization mask.

4. The method of claim 1, wherein the recognizing of the movement pattern of the object based on the extracted one or more feature points comprises:
determining a movement of each of the extracted one or more feature points by tracking the extracted one or more feature points;
classifying a movement pattern of the extracted one or more feature points based on the determined movement; and
recognizing the movement pattern of the object based on the classified movement pattern.

5. The method of claim 1, wherein the controlling of the electronic device based on the recognized movement pattern comprises:
obtaining a control signal corresponding to the recognized movement pattern; and
controlling the electronic device based on the obtained control signal.

6. A method of controlling an electronic device by recognizing multiple movements, the method comprising:
obtaining at least one image;
dividing the obtained at least one image into a middle zone and a peripheral zone, wherein the middle zone comprises at least one middle image, and the peripheral zone comprises at least one edge image;
recognizing a movement pattern of a first object located in the middle zone from among a plurality of movement patterns;
recognizing a movement pattern of a second object located in the peripheral zone from among the plurality of movement patterns;
identifying an instruction corresponding to the recognized movement pattern of the first object and the recognized movement pattern of the second object; and
controlling the electronic device based on the identified instruction,
wherein the recognizing of the movement pattern of the second object comprises:
obtaining a second object image from the at least one edge image;
obtaining a first object image from the at least one middle image;
verifying the second object image by using the first object image;
determining the verified second object image as an image of the second object serving as a subject of the movement;
extracting one or more feature points of the second object from the image of the second object serving as a subject of the movement; and
recognizing the movement pattern of the second object based on the extracted one or more feature points.

7. The method of claim 6, wherein the controlling of the electronic device based on the movement pattern of the first object and the movement pattern of the second object comprises:
combining the movement pattern of the first object and the movement pattern of the second object; and
controlling the electronic device based on the combined movement pattern.

8. An electronic device for obtaining a control signal by recognizing movement of an object within a peripheral zone of field of view (FOV) of a camera, the electronic device comprising:
the camera for obtaining an image;
a storage for storing a program comprising one or more instructions; and
at least one processor configured to execute the one or more instructions stored in the storage to:
obtain at least one image including an image of the object by controlling the camera;
divide the obtained at least one image into a middle zone and a peripheral zone, wherein the middle zone comprises at least one middle image, and the peripheral zone comprises at least one edge image;
obtain a first object image from the at least one edge image;
obtain a second object image from the at least one middle image;
verify the first object image by using the second object image;
determine the verified first object image as the image of the object serving as a subject of the movement;
extract one or more feature points of the object that are within the peripheral zone from the image of the object serving as a subject of the movement;
recognize a movement pattern of the object from among a plurality of movement patterns based on the extracted one or more feature points;
identify an instruction corresponding to the recognized movement pattern of the object within the peripheral zone; and
obtain the control signal based on the recognized movement pattern of the object within the peripheral zone.

9. The electronic device of claim 8, wherein the at least one processor is further configured to execute the one or more instructions to:
remove noise unrelated to the movement of the object from the at least one edge image; and
extract the one or more feature points from the at least one edge image from which the noise has been removed.

10. The electronic device of claim 9, wherein the at least one processor is further configured to execute the one or more instructions to remove the noise unrelated to the movement from the at least one edge image by using a binarization mask.

11. The electronic device of claim 8, wherein the at least one processor is further configured to execute the one or more instructions to:
determine a movement of each of the extracted one or more feature points by tracking the extracted one or more feature points;
classify a movement pattern of the extracted one or more feature points based on the determined movement; and
recognize the movement pattern of the object based on the classified movement pattern.

* * * * *